United States Patent [19]

Weber

[11] Patent Number: 5,013,990

[45] Date of Patent: May 7, 1991

[54] ENERGY CONSERVING ELECTRIC MOTOR POWER CONTROL METHOD AND APPARATUS

[76] Inventor: Harold J. Weber, 313 Washington St., P.O. Box 6161, Holliston, Mass. 01746-6161

[21] Appl. No.: 422,079

[22] Filed: Oct. 16, 1989

[51] Int. Cl.$^5$ ............................................. H02P 7/622
[52] U.S. Cl. .................................... 318/814; 318/812; 318/822
[58] Field of Search ................ 318/713, 745, 784, 785, 318/786, 787, 814, 815, 821, 822, 823, 827

[56] References Cited

U.S. PATENT DOCUMENTS

| | | | |
|---|---|---|---|
| 3,166,702 | 1/1965 | Horsley | 318/823 |
| 3,657,622 | 4/1972 | Reuland et al. | 318/823 X |
| 4,052,648 | 10/1977 | Nola | 318/810 |
| 4,266,177 | 5/1981 | Nola | 318/810 |
| 4,288,737 | 9/1981 | McClain et al. | 318/815 X |
| 4,533,857 | 8/1985 | Chang et al. | 318/345 A |
| 4,727,305 | 2/1988 | Muskovac et al. | 318/806 X |
| 4,806,838 | 2/1989 | Weber | 318/729 |
| 4,823,067 | 4/1989 | Weber | 318/799 |

FOREIGN PATENT DOCUMENTS

| | | | |
|---|---|---|---|
| 54-104525 | 8/1979 | Japan | 318/823 |
| 61-15581 | 1/1986 | Japan | 318/823 |

OTHER PUBLICATIONS

Magazine: "Record May for Majors", *Appliance Manufacturer*, Aug. 1989, p. 8 (newsitem).
Magazine: Arthur Fisher, "Saving the Planet", *Popular Science*, Oct. 1989, pp. 51-56 (particularly p. 53).

*Primary Examiner*—Bentsu Ro

[57] ABSTRACT

An energy conserving device which reduces excess level of alternating current power fed to RUN windings of an a.c. electric induction motor whenever the motor is less than fully loaded. A voltage dropping reactor coupled between an a.c. power source and the motor produces about 10–30% reduction in applied motor terminal voltage under reduced motor load running conditions, while a semiconductor switch acts to instantly shunt out the voltage dropping effect of the reactor and couple an increased portion, or full level of a.c. terminal voltage to the motor whenever the motor load increases. Changes in instantaneous levels of motor loading may be determined by changes in motor speed slip, determined from the motor's operating power factor, or preprogrammed. As a result of less a.c. power being applied to the motor under all but full-load conditions, a considerable reduction in eddy current and winding resistance losses is obtained which may save 20% or more in electrical energy usage in refrigerators, air conditioners, and other major appliances and as a result considerably lessen power demand from utility lines.

20 Claims, 15 Drawing Sheets

ENERGY CONSERVING ELECTRIC MOTOR POWER CONTROL METHOD AND APPARATUS

FIELD OF INVENTION

My invention relates to the field of ENERGY CONSERVATION through ENERGY SAVINGS obtained by reducing the level of commercial electrical power ordinarily WASTED in routine daily operation of hundreds of millions of electric induction motors.

My invention pertains to the variable control of electrical power fed to a.c. electric induction motors, and in particular to the instantaneous modulation of the electrical power flow in proportion to changes in the level of any load driven by the motor. My invention reduces the terminal voltage and hence the power applied to a lightly loaded electric induction motor, and increases the terminal voltage and applied power as the induction motor load increases. My invention is fundamentally an ENERGY CONSERVING apparatus which is intent on reducing energy losses in common electric motors where such losses ordinarily are the result of excessive eddy current and winding resistance losses, particularly when the motor is less than fully loaded.

My invention finds particular utility with air conditioning and refrigeration equipment, wherein induction motors operate over long periods of time and under widely varying load conditions.

My invention is in particular an ENERGY SAVING contribution which lessens the need for additional nuclear and conventional power generating plants if the invention is implemented in mass-produced major appliances, such as air conditioners and refrigerators in particular. For example, according to the American Council for an Energy Efficient Economy (ACEEE) "refrigerators alone use seven percent of the whole U.S. electricity output. (Arthur Fisher, "How to Help Reduce Greenhouse Gases", *Popular Science* magazine, October 1989, page 53). Therefore, a mere 20% reduction in overall electric power consumption by the 125-million or so domestic refrigerators in use today (whereby the reduction might be obtained over a period of time through the inclusion of my invention as a feature in new refrigerators, as old models are replaced with new models) which could result in conservation of more electricity than what at least several major nuclear power plants can produce, assuming the average refrigerator now draws about 300 watts and runs about 20% of the time. More particularly for example, merely during the month of May 1989 more than 686,200 refrigerators were "shipped" (*Appliance Manufacturer* magazine, August 1989, Page 8) which, through simply using the ENERGY SAVINGS of my invention could have saved through conservation more than eight megawatts of on-line power generating capacity! Obviously, my invention can contribute even greater savings in air conditioning power consumption, etc. As a result, my invention may contribute significantly to the reduction of atmospheric pollution, the attendent deleterious "greenhouse effect" and the occurance of acid rain; all without the drawback of causing any noticable change in public lifestyle.

BACKGROUND OF INVENTION

Alternating current electric motors, and particularly a.c. induction motors, tend to waste a considerable amount of electric power when operating with anything less than a full load coupled with their output shaft. Induction motors are the mainstay of certain widespread applications: in particular, they are almost universally used in refrigerators and air-conditioners because they have many features which make them attractive for inclusion in the usual unitized "hermetic" motor/compressor assembly typical of such appliances. Such features include proven reliability, absence of brushes, simple and cheap construction, relatively quiet operation, and a good history of predictable design performance. Induction motors also find widespread application in other domestic and commercial appliances, such as washing machines, clothes dryers, dishwashers, pumps, compressors, and so forth. Again, their advantage is cheap, simple design and predictable performance.

Induction motors are particularly prone to ENERGY LOSS when operating with less than full load. A typical $\frac{1}{3}$-horsepower induction motor, which might be typified by a General Electric model H35JN30T, draws about 6.6 amperes under full load and exhibits a power factor of about 80% or so. Under light load, and particularly under no-load, this same motor exhibits miserable actual efficiency because the internal losses remain high while the output power demanded from the motor lessens. Although the power factor may drop to 30% or so, the apparent current still remains high ... on the order of 4.9 amperes. As such, even though the 607 watts draw under full load may drop to about 170 watts under no-load: it is the range of operation between full load and this later no-load (or lightly loaded) value which is the basis for considerable improvement in my invention. At half-load, the power draw remains high, being nearly 360 watts. The following BASIC computer routine may be used to determine not only running efficiency, but also wasted power:

```
10 REM MOTOR EFFICIENCY DETERMINATION                           MOTEFF-1.BAS V1.01
20 REM                                                    MBASIC-80 (c) H. Weber K1VTW 9/9/89
30 PRINT CHR$(27) + "[2J"+ CHR$(27) + "[f"                ' clear screen and home cursor
40 PRINT "Enter   A.C. LINE VOLTAGE:                                       ";:INPUT LV
50 PRINT "       Motor OUTPUT (Decimal H.P.)                               ";:INPUT HP
60 PRINT "       APPARENT Motor CURRENT                                    ";:INPUT MI
70 PRINT "       ACTUAL POWER FACTOR                                       ";:INPUT PF
80 EF = ((74600!/(MI*LV*PF))*HP)*100
90 PWX = (MI*LV*PF*(100-EF))/10 4
100 PRINT:PRINT "MOTOR EFFICIENCY is:                                      "EF" percent"
110 PRINT "WASTED Motor POWER is:                                          " PWX "watts"
120 PRINT:PRINT:END
```

Using this routine, you will obtain the following display when entering full-load and half-load values:

| | |
|---|---|
| Enter A.C. LINE VOLTAGE: ? | 115 |
| Motor OUTPUT (Decimal H.P.) ? | .333 |
| APPARENT Motor CURRENT ? | 6.6 |

-continued

| | |
|---|---|
| ACTUAL POWER FACTOR (percent) ? | 80 |
| MOTOR EFFICIENCY is: | 40.9121 percent |
| WASTED Motor POWER is: | 358.782 watts |
| Enter A.C. LINE VOLTAGE ? | 115 |
| Motor OUTPUT (Decimal H.P.) ? | .167 |
| APPARENT Motor CURRENT ? | 5.8 |
| ACTUAL POWER FACTOR (percent) ? | 55 |

It is well known that eddy current losses and winding losses contribute most of this power waste, particularly when operating under less than full load. This power waste appears as heat, producing "temperature rise" within the motor structure. Also known is that the apparent current (e.g., 5.8 amperes at half-load) must circulate through the winding, and the induced magnetic field must magnetize the core material of the stator. It is only that the energy stored in the inductance of the core "returns" energy to the system that some semblence of efficiency is obtained, observable as low power factor manifested as phase lagging current flow. Large power loss occurs because the apparent current flow must overcome all the possible "friction" losses of the core material and the winding resistance. In cheap commercial motors particularly, these losses can be substantial. Economy motors are designed to operate with high current density in their windings, and with near-saturation of the core material.

When an ordinary induction motor is lightly loaded, the rotor "speeds up" with the result that the stator inductance actually tends to increase, resulting in the low power factor intrinsic with unloaded or lightly loaded induction motor operation. Clearly it would be better if the motor's rotor did not speed-up, but instead that it would continue to slip or drag by about the same amount under light load as what it does under full load. By reducing the applied stator voltage, the field is weakened and the rotor torque is lessened resulting in this desirable condition of slip or drag. The benefit is that the current power factor remains high, nearly that obtained under full load with full power applied. Mere reduction of the applied stator voltage is, by itself, unacceptable in most motor applications because any unexpected increase in motor loading can result in stalling and unsatisfactory operating characteristics, and can even lead to motor burnout.

Modern high-permeability core materials may also exhibit a somewhat more abrupt "knee" where saturation occurs. With an economy design approach, wherein the operating point for the core material making up the motor's stator structure is established with a high flux density under normal line voltage, it can be seen that an unsual increase in line voltage can bring about a very serious decrease in efficiency as saturation of the core material is approached. Under such a condition, the increased line voltage contributes nothing except power waste to the overall operation of the motor. Such losses tend to be regenerative, in that the mentioned increase in losses produces more heating, which in turn increases the losses (i.e., winding resistance loss, etc.).

Electric utility companies frequently introduce "brown-out" conditions during peak-usage periods or during unseasonable load demand periods (such as most notably, during a hot and humid summer period when air-conditioners are working hard). In the ordinary motor construction, such a brown-out condition can cause failure of induction motors, with stalling and overheating. My invention might be useful in overcoming these brown-out attendant problems, at least in critical applications where the stoppage of a motor can not be afforded. For example, in this kind of "brown out resistant" configuration the motor may be designed to produce its full torque (e.g., horsepower) at a reduced voltage level of say 100 volts and the control system of my instant invention will allow the motor to still accomodate line voltage operating conditions of 117 or even 125 volts or more without undue electrical loss or malperformance.

Economy motor designs are not only found in motors like the mentioned major appliance motor, but also they are ubiquitously found in the motors used in hermetic sealed refrigeration and air conditioning motor/compressor units. Induction motors of ordinary split-phase or capacitor start design are known in hermetic units, such as a Whirlpool model S462544/H2269; General Electric model PS-36-1/4; Americold model ML090-1; Tecumseh model S4416; Matsushita model FN91F17R, and others.

In my prior U.S. Pat. No. 4,806,838 "A.C. Induction Motor Energy Conserving Power Control Method and Apparatus" and U.S. Pat. No. 4,823,067 "Energy Conserving Electric Induction Motor Control Method and Apparatus" I particularly teach how motor losses may be greatly reduced through the use of two separate parallel-acting RUN windings. One higher impedance RUN winding supplies a sufficient portion of the field strength flux to operate the motor under partial load, while the other lower impedance RUN winding is modulated with a.c. power to increase the field strength flux as the motor load increases. In the '838 patent, I sense the power factor of the motor and as the power factor decreases when the motor loading lessens, I reduce excitation to the modulated RUN winding thereby increasing the apparent power factor. In my other '067 patent I utilize load-related changes in sub-synchronous motor speed slip to establish corresponding changes in the modulated RUN winding excitation.

In both of these prior patents a unique motor winding arrangement is needed in order to obtain increased efficiency. It was not the purpose of these prior inventions to necessarily be applicable to pre-existing motors, such as found in refrigerators, air conditioners, and other appliances. It was more the intent for the invention of these prior patents to provide a convienent and effective arrangement for manufacturers to use in their new motor designs in order to obtain a major increase in efficiency.

Older motors may also benefit from the kind of a.c. power control taught under these prior patents, but in order to do so a motor controller is needed which can operate to produce a virtual control effect which is equivalent in ENERGY SAVINGS with that of my prior invention's unique multiple RUN winding embodiment. I therefore conceived a controller that produces such improvement, but requires no change in the older motor's design: e.g., it operates well with merely a single RUN winding arrangement in the motor.

The need for my current invention is to SAVE ENERGY in pre-existing motor applications, particularly such as found in air conditioners and similar equipment.

Manufacturer's of new equipment may also benefit from the ENERGY SAVING contribution of my invention without having to re-engineer the electric motor which may already be part of a proven product design, or consist of considerable inventory.

SUMMARY

Hundreds of millions (say: billions!) of electric induction motors operate daily, while supplying less than full rated load. Induction motors of ordinary cheap commercial design (such as found in most consumer products, like air-conditioners, refrigerators, washing machines, etc.) operate under internally produced electromagnetic stress even when partially loaded. Such stress brings about significant eddy current losses in the stator (field) core structure, and "copper" winding losses in the RUN windings. Even when operating with less than full load, very considerable apparent current flow occurs through the windings and acts to magnetize the stator core structure. Admittedly, power factor lessens when the motor is lightly loaded, but such power factor decrease gains little in improved operating efficiency of the windings and the core material since it is the level of apparent current flow which determines eddy current and copper losses. It is the net inductance of the winding arrangement which serves to "return" power to the line, albeit of lagging phase. The magnetization of the core by the apparent current flowing through the windings continues to introduce considerable frictional losses which may be likened to lowered "Q" of the inductive field (resulting in dissipation of power in each the stator core material, and in the wire comprising the RUN winding.

Common economic practice dictates engineering the stator structure and the associated RUN windings to operate near saturation. High a.c. magnetic fields produce considerable losses as the core material nears saturation during a portion of each cycle of the exciting a.c. waveform. Additionally, the nearly-saturated core material gives a "shorted turn" effect to the RUN winding (i.e., the stator winding inductance is lessened), increasing circulating current through the RUN winding and introducing substantial resistance loss.

Through the expedient of reducing the motor terminal voltage and resulting excitation, the characteristics of an ordinary induction motor shift considerably. Torque is of course reduced, as is horsepower potential. More importantly though is that reduced peak excitation of the RUN winding removes a considerable portion of the eddy current loss, because the magnetizing field is less intense. In a like way, winding loss is reduced because the reduction in near-saturation of the stator core results in a higher "Q" of the RUN winding, resulting in more efficient energy use.

Merely reducing the applied motor voltage does not ordinarily work. The reduced torque can cause stalling, or problems in start-up. What is needed is an approach where full motor voltage is applied when the motor is working hard, as when driving a full load. In less than full load operation the motor voltage may be reduced in proportion to any load decrease, with substantial advantage gained in motor efficiency and with negligible change in operational performance.

In another earlier U.S. Pat. No. 4,052,648 (and U.S. Pat. No. 4,266,177) issued to Frank Nola, phase-angle modulated a.c. power control of the full applied motor current in proportion to motor loading (as determined by a.c. power factor measurement) is taught as providing improvement in efficiency. What resulted however was less than optimum realizable performance because his phase-angle controlled power (delivered by mere phase-angle thyristor control of the RUN winding power, much like the control afforded by a "light dimmer") introduced severe a.c. power waveform distortion and resulted in harmonic losses which adversely acted to offset any gain proposed by the invention, when used in common applications. Such abrupt pulsing of the a.c. power line caused all kinds of losses in wiring, circuit capacitance, and in addition introduced noise pulses into the utility line which could produce radio interference (buzzing) and noticable light flicker. While these later shortfalls could possibly be overcome by appropriate power line filtering, such additional steps were both costly and bulky. More objectionably, the sudden pulsing of the stator core of the motor (when the motor was of ordinary commercial construction) appears to lead to increased losses introduced by the "fast-rise" character of the leading edge of the thyristor controlled a.c. power pulse. In effect, the eddy current losses increased. Quick turn-on of substantial power as thyristor controlled pulses in the Nola controller also leads to magnetostrictive forces of considerable magnitude in the stator core material, which manifest as a "buzz" like noise. The triac thyristor used by Nola also had to have substantial ratings, since it had to handle the full motor current and the stress of the full peak line voltage.

Now comes my instant invention which teaches an unprecedented approach wherein a.c. power line distortion is kept to a minimum, in which considerable a.c. power flow continues to flow over the full swing of each a.c. power cycle, while the modulated portion of the controlled power flow is cushioned by the greater full-cycle power flow and as a result negligible harmonic losses occur and other related problems are sidestepped.

In my invention most of the induction motor's operating current is drawn over the full a.c. power cycle, and only a lesser portion of the a.c. power is modulated by a semiconductor switch (such as a thyristor or power transistor). As such, the substantial power draw obtained over the full a.c. power cycle serves to efficiently swamp-out the lossy effects which might otherwise occur due to phase angle modulated a.c. power control of a lesser portion of each cycle of the a.c. power waveform as may be caused to change between partial and full load operation of the motor. I have obtained this improved more ENERGY EFFICIENT operation, without the shortfalls of the prior apparatus of Nola and others known to me, and without the separate dual RUN windings of my prior patents. I have obtained this improvement mainly through the novel inventive act of contriving a reactance in series with the motor's main RUN winding and regularly changing the voltage dropping effect of the reactance in proportion to changes in instant motor loading, as might be sensed through changes in power factor or speed slip.

My invention provides reactive control of the power applied to the motor RUN windings through a small inductor (i.e., a choke coil) coupled in series between the a.c. power line and the windings. The inductance of the choke is selected to provide a suitable voltage drop under minimum motor load to maintain smooth motor operation: in practice for a 117 volt a.c. motor, I have found that a choke that provides a voltage drop on the order of 16 to perhaps about 34 volts can be used. The exact voltage drop is best determined by selective tradeoff between the operating characteristics of a particular motor design and the range of overall load variation which it will drive. In practice, I have found it convenient to operate the motor through a Variac, and to reduce the voltage until the desired motor operating point is found. The difference between the reduced voltage level and the normal line voltage may then be used to define the voltage drop which is desired to be obtained across the choke. Through measurement of current flow under the reduced 60 hertz power voltage condition, the inductance may be (at least roughly) determined by:

$$L = EA/(IA \times 6.28 \times 60)$$

where:
L=choke inductance, henries
EA=reduced voltage level
IA=current with reduced voltage As a practical matter, I have found that a choke comprising about 100 turns of 20 guage magnet wire wound on a $\frac{7}{8}'' \times \frac{7}{8}''$ EI construction transformer style iron core suits a particular 1/6 horsepower compressor motor that is rated for 4 amperes under 115 volt a.c. operation.

The inductance afforded by the choke may also be provided by the low impedance "primary" winding of a transformer, which includes an inductively coupled higher impedance "secondary" winding. The higher impedance secondary winding may then be shunted with a capacitor, with the result that improved a.c. power waveform is had, and semiconductor switch (e.g., thyristor) commutation is reliable.

A transformer having "step-up" configuration (either having separate windings or of autotransformer configuration) may also be coupled to have a relatively low impedance primary winding in series with the motor's RUN winding, while the transformer's higher impedance secondary winding is changably shunted (shorted out) by a thyristor or transistor switch. When the secondary is shorted, most of the available a.c. power couples directly through the primary winding as though it were a very low impedance. The real impedance is mainly that of a smallish losses incurred in the transformer primary and secondary winding resistance, and any intrinsic leakage inductance. Some small portion of power loss may also occur in the transformer, due to winding losses and eddy current losses in the core material. In the usual practice of my invention, such winding and eddy current losses are tiny compared to the magnitude of winding and eddy current losses obtained in an un-controlled motor's operation. The principal advantage of this hookup is that the semiconductor switch (thyristor or transistor) handles less current, and therefore may be of smaller construction.

A purpose of my invention is to teach ENERGY SAVING power reduction in the operation of less-than-fully loaded electric induction motors.

Another purpose of my invention is to show how such ENERGY CONSERVATION may be obtained from ordinary electric induction motors without re-engineering the motor's construction.

My invention aims to improve the electrical efficiency of induction motors through reduction of eddy-current and winding resistance losses when the motor is less than fully loaded.

The fundamental essence of my invention involves the use of an inductor which presents an impedance in electrical series with the current flow coupled with an ordinary electric induction motor, together with a phase angle controlled thyristor or transistor switch which shunts-out a portion of any voltage drop developed across the inductor (during each a.c. power half-cycle) in proportion to changes in motor loading.

My invention's embodiment is taught to use a transformer having a relatively low-impedance primary inductance coupled in series with power flow to the motor, and a higher inductance secondary the instant impedance of which is continuously modulated by the phase-angle controlled switching action of a thyristor or transistor.

My invention also aims to provide ENERGY SAVING improvement of ordinary induction motor designs, including the split-phase, capacitor start, permanent split capacitor, and shaded-pole configurations.

My invention serves to show particular adaptation to hermetic refrigeration compressor motors, in which an induction motor operates in a sealed environment over long periods of time and under widely varying load conditions.

My invention further aims to obtain aftermarket application of ENERGY SAVING electrical power consumption reduction to major appliances, such as air-conditioners.

Importantly my invention divulges a method of operation and apparatus suited for obtaining such operation which is stable and predictable, preferably using digital circuit elements which may be predetermined to have desired operating characteristics without requiring production-line or field adjustment.

Furthermore my invention reduces a.c. power line distortions, including deleterious harmonic energy, to negligible proportions unlike previously known energy conserving motor control devices.

DESCRIPTION OF MY INVENTION

Figure 1:
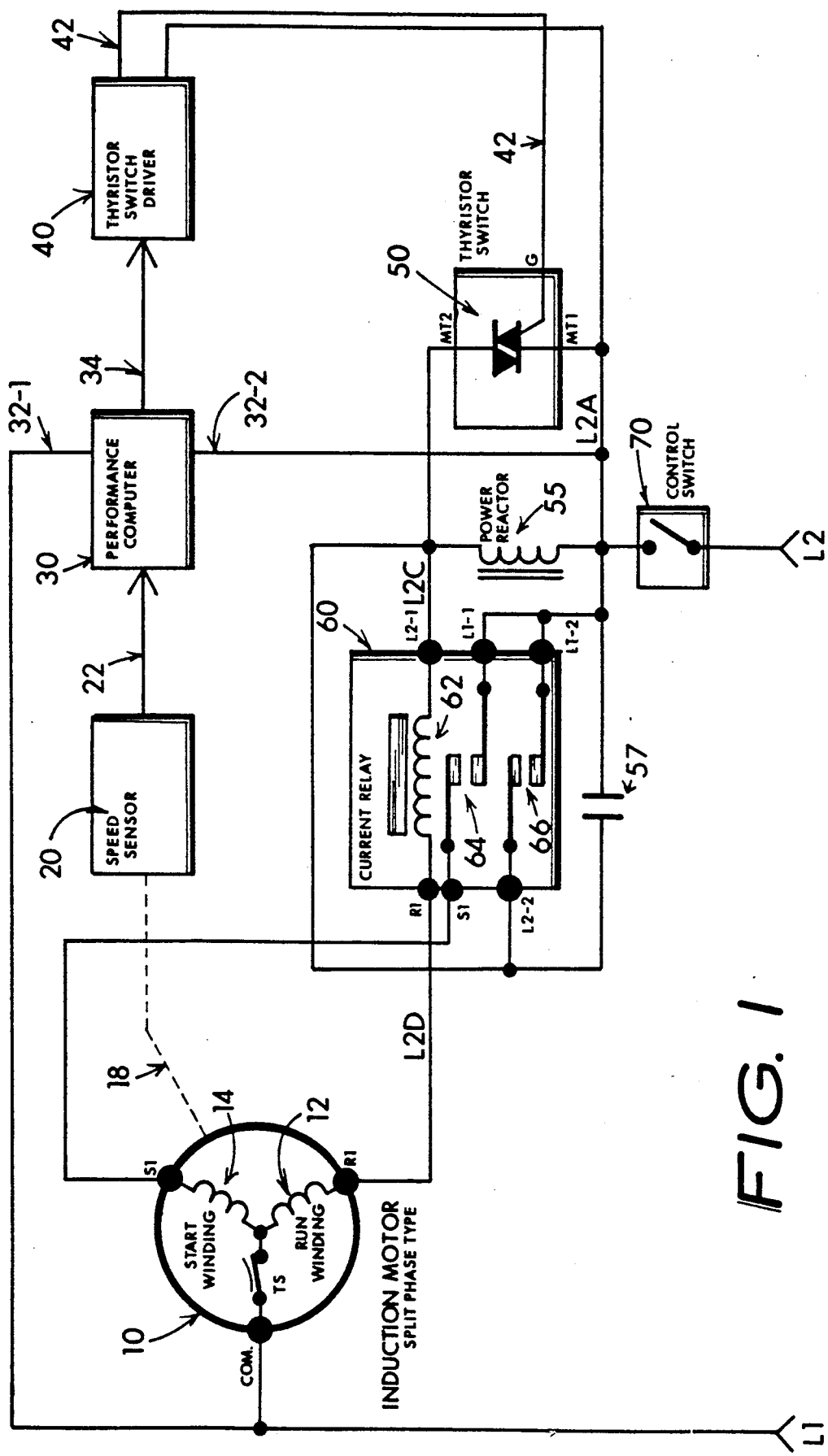
FIG. 1—Slip-speed load sensing control of appliance type induction motor.

In FIG. 1, my invention is depicted in conjunction with a split-phase motor 10 such as used in a hermetically sealed refrigeration motor compressor assembly. Such a hermetic motor unit may be typified by a model T37CN motor/compressor found in certain Westinghouse refrigerators, or a Kelvinator model A045 motor/compressor. The motor includes a RUN winding 12, and a START winding 14. A speed sensor 20 is coupled 18 with the motor and is effective to determine the rotational speed of the motor's rotor. The sensed speed information produces a signal on line 22 that couples with the input of a performance computer 30, together with reference frequency and power signals provided on lines 32-1 and 32-2 from an a.c. power line that couples with terminals L1 and L2. The performance computer performs to produce a gate turn-ON signal on line 42 whenever the motor speed is less than a predetermined (usually full-load) speed value. Conversely of course, the signal on line 42 is disabled for part or all of the a.c. power cycle whenever the motor speed exceeds a predetermined speed value, as it normally does under light load conditions. The gate signal on line 42 couples with the gate of a semiconductor switch (e.g., a thyristor such as a triac) 50, the power terminals MT-1 and MT-2 of which couple in parallel with a power reactor 55. The inductance of the reactor is preferably sized to produce about 10% to 20% voltage drop between its terminals due to the current flow produced by the motor's RUN winding 14 which is drawn through the reactor. When the thyristor switch 50 is turned-ON by the signal on line 42, the reactor's inductive voltage drop is reduced almost to nil, being limited to merely the voltage drop developed across the turned-ON thyristor. A motor starting relay 60 is shown to have a coil (between terminals R1 and L2-1) coupled in series between the motor's RUN winding 12 (line L2D) and the reactor 55 (line L2C). When power is initially applied to the circuit, as might be done when the control switch 70 (viz, a thermostat, timer, or other such device) contacts CLOSE feeding power to line LZA, overcurrent is drawn by the RUN winding due to the motor's rotor being stalled (or running at substantially less than normal speed). The relay (as is usual practice) is sized such that the motor's overcurrent condition produces pull-in of the relay's armature, closing the normally-open contact sets 64 and 66. Contact set 64 couples a.c. power to the START winding 14, thereby producing the necessary rotational torque needed to "start" the motor. The other contact set 66 shunts the power reactor and thyristor, thereby bypassing the heavy starting current from flowing through the thyristor. A snubber capacitor 57 serves to reduce any transient spiking which may be produced by the thyristor 50 turn-ON, thereby improving the a.c. power waveform and assuring more reliable operation of the thyristor.

Figure 2:
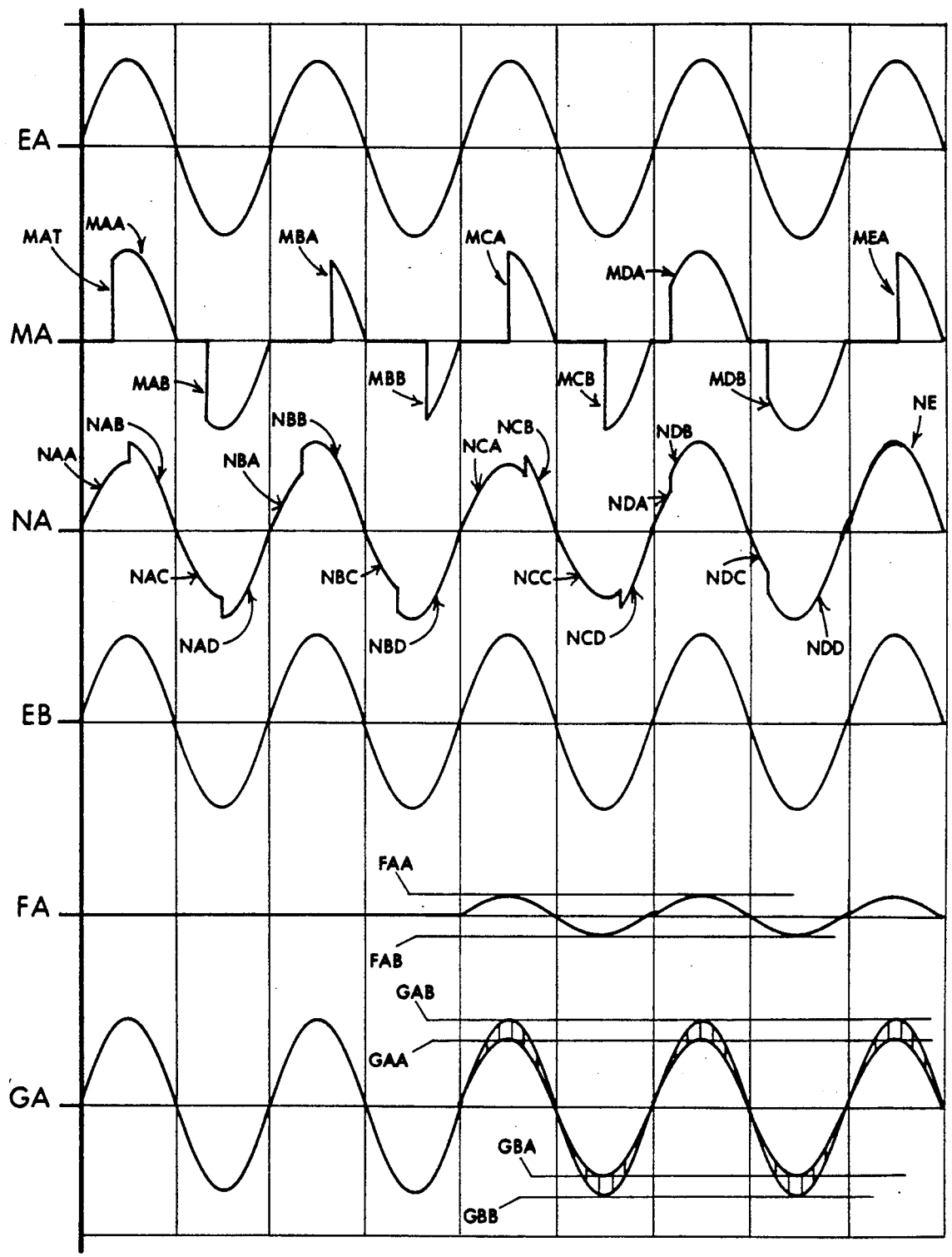
FIG. 2—Waveforms of controllers for providing energy savings.

FIG. 2 depicts electric power waveforms produced by the prior art as compared with my instant invention. The uppermost waveform EA shows waveforms characteristic of common 60-hertz commercial utility power. When the invention taught by the mentioned Nola U.S. Pat. Nos. 4,052,648 and 4,266,177 is used to control a motor, the abruptly turned-ON waveforms MA occur. For example, in Nola's '177 patent when the triac 16 turns-ON MAT the partial waveform MAA is produced. As can be seen, the turn-ON is abrupt and the waveform which results is highly distorted: the result is a power switching circuit which is rich in harmonics and introduces substantial losses into the load 14 which largely degrades any power-conserving advantage which the circuit might otherwise afford. For various phase-angle delays (i.e., power factor changes) which are sensed, various duration power "pulses" MAB; MBA, MBB; MCA, MCB; MDA, MDB; MEA result . . . each of which are highly distorted partial cycles of power flow.

The waveform NA of FIG. 2 continues to show the substantial improvement my earlier U.S. Pat. Nos. 4,806,838 and 4,823,067. For example, in FIG. 7 of the '067 patent considerable a.c. power flows throughout the a.c. power cycle (illustrated by waveform portions NAA, NAC; NBA, NBC; NCA, NCC; NDA, NDC of my instant invention.) When the triac 200 (of the '067 patent) turns-ON, the rest of each a.c. power cycle "increases" about 20% or so as depicted by the corresponding FIG. 7 waveform portions NAB, NAD; NBB, NBD; NCB, NCD; and NDB, NDD. Gone is the abrupt "zero-to-full" turn-ON characteristic of the earlier Nola '177 patent together with the detrimental effects of a pulse like and sometimes assymetrical power flow that is rich in harmonics.

Waveforms EB, FA, and GA in my instant invention FIG. 2 serve to convey the subtractive combination of the a.c. power with a voltage drop developed across the reactor which (compared to prior art) serves to maintain a clean waveshape for any ensuing current flow between the a.c. line and a load, such as an induction motor 10 of FIG. 1. When the thyristor (e.g., a triac) 50 is "ON", the reactor 55 is shunted and full a.c. power (which may be coupled between the line terminals L1, L2) appears across the motor 10 RUN winding 12 (by way of the current relay 60 coil 62). Under light load, when the motor 10 "speeds-up" to such an extent that the performance computer 30 and switch driver 40 cooperate to maintain the triac 50 "OFF", then a lesser level waveform FAA, FBA appears as a voltage drop developed across the unshunted reactor 55 winding. Since the reactor voltage drop is in series with the a.c. power line, it will effectively "subtract" from (or oppose) the voltage available to the motor RUN winding 12. I depict this change in FIG. 2 as the change between a full level of RUN winding excitation (when the reactor is shunted by the ON-state triac) as waveform levels GAB, GBB. On the other hand, when the triac is maintained OFF (under light motor load, for example) then the reactor serves to reduce the RUN winding excitation to that of the depicted waveform level GAA, GBA. The level GAA for example may be expressed as (in voltage levels):

$$GAA = GBA - FAA.$$

It is the difference between these two levels (for example, between power level GAA and GAB) which is where power saving occurs because power level GAA continues to provide the motor with sufficient excitation to keep it running properly, while the losses inherent in the motor are very much lessened due to the lower peak levels of magnetic excitation and winding current flow afforded by the reduced excitation waveform proportions. The change between levels may also be set to occur only at zero crossover, and with integral cycle control, thereby eliminating the parasitic losses caused by harmonics and assymetrical power flow that plagued earlier known efforts by Nola and others.

Figure 3:
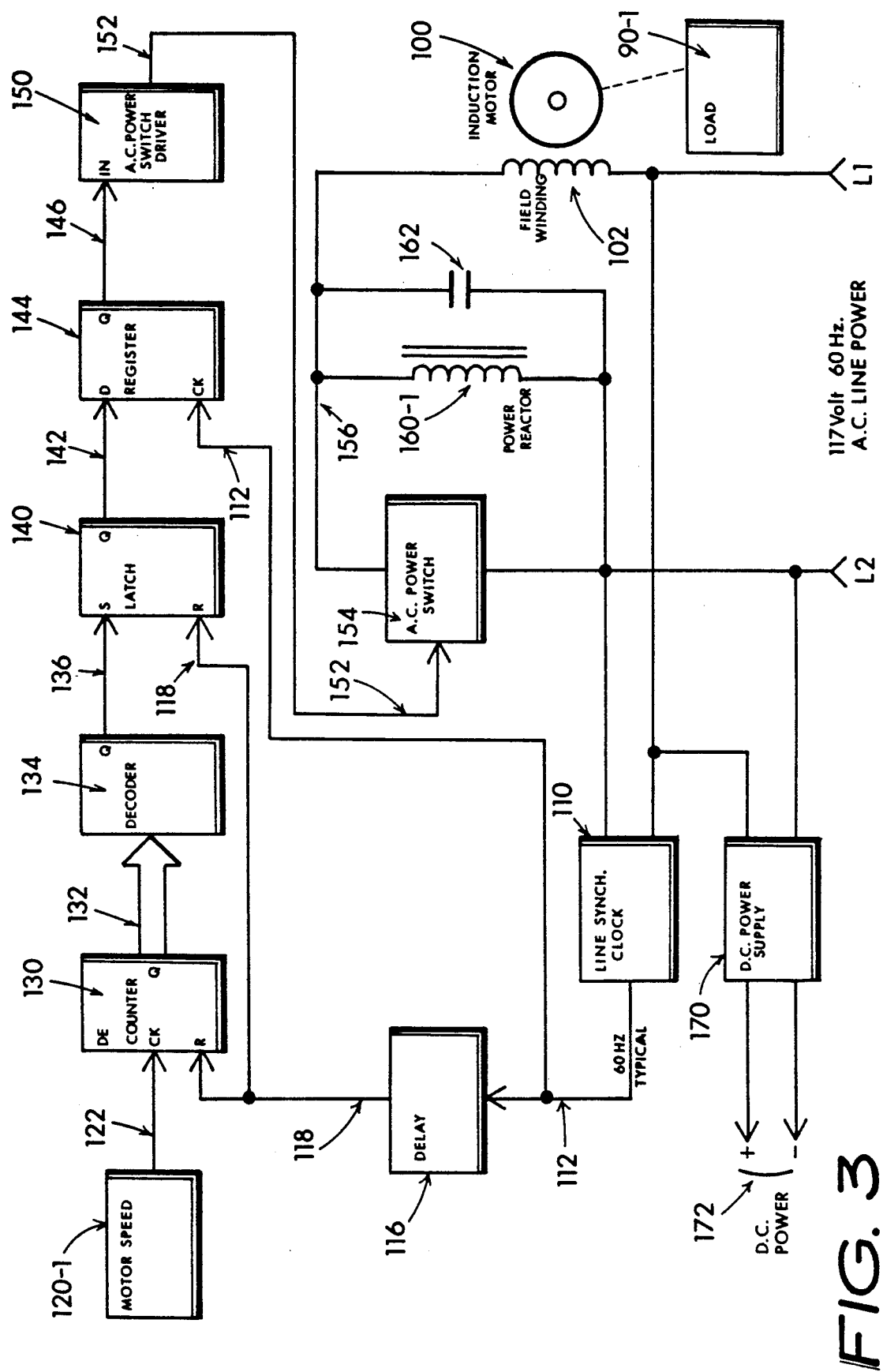
FIG. 3—Block diagram for slip-speed sensor type of energy controller.

In FIG. 3 I show operation of a particular configuration of the performance computer portion of my invention which may serve to operate an induction motor 100 (which is coupled with a mechanical load 90-1) with improved efficiency. The motor's rotating member (e.g., rotor) normally spins at a subsynchronous speed when a field winding 102 is excited with alternating current power. Typically, such rotor speed may be on the order of 1,725 r.p.m. for a 4-pole motor, or 3,450 r.p.m. for a 2-pole motor when operating from 60-hertz power. A line synchronization clock 110 couples with the a.c. lines L1, L2 and derives a line frequency clock signal on line 112, while a delay circuit 116 serves to produce a slightly delayed clock signal on line 118. A motor speed sensor 120-1 serves to sense the rotor's speed, producing a signal on line 122 which has a frequency component derived from the sensed rotor speed. This speed signal on line 122 couples with a clock CK input of a multistage counter 130. The delayed clock signal on line 118 serves to periodically RESET counter 130. The counter's count-value is predetermined to be such that when the motor is running faster than FULL LOAD speed the frequency signal on line 122 will be sufficient to allow the counter output signals on line 132 to advance to a value which may be decoded 134 and produce a HIGH signal on line 136 at some point during the period of time between the recurrant resetting of the counter 130 by the clock pulses on line 118. Conversely, when the motor speed slows to a value even slightly less than full load speed, the counter will not count up to a value high enough to be decoded, and the decoder 134 output signal on line 136 remains LOW.

A HIGH state signal on line 136 which indicates the motor is probably running with light load, and faster than full load speed serves to SET a latch 140 transferring a HIGH state to the latch's Q output line 142 which then couples with a "D" input of a clocked register (flip-flop) 144. The clock signal on line 112 periodically transfers the contents of the register's "D" input to a Q output line 146, and when the input is HIGH, the output is clocked HIGH. A semiconductor switch driver 150 is used to produce a signal on line 152 which is LOW or inactive when the input signal on line 146 is HIGH, with the result that a a.c. power switch 154 which might be a triac is NOT turned-ON. The result is that considerable voltage drop occurs across a power reactor 160-1 resulting in reduced motor 100 operating power and ordinarily some (albeit only a few percent) slow-down of the motor's speed.

As the motor speed slows down, the speed signal frequency on line 122 slows down, and counter 130 does not sufficiently count-UP between reset pulses to enable the decoder 134 to produce a HIGH signal on line 136. Instead, line 136 remains LOW with the result that the latch 140 does not change state between the RESET signals coupled thereinto from line 118. Accordingly, the latch 140 Q output line 142 signal remains LOW. On the next clock pulse occurrence on line 112, the LOW state coupled into the register 144 "D" input produces (or maintains) a LOW state signal on line 146. The switch driver 150 now acts, in response to the LOW state signal on line 146, to produce a signal on line 152 that acts to turn-ON the triac 154 semiconductor switch. As a result of this series of events, the turned-ON triac shunts the reactor 160-1 with the result that essentially full a.c. power is fed to the induction motor 100. The motor immediately speeds-up, and operates with increased torque, thus overcoming any decrease in speed which might have occurred due to a voltage drop permitted across the reactor 160-1 during preceding power cycles. Due to the line-frequency synchronized derived 60-hertz clock signal on line 112, zero crossover full-integral-cycle switching by the power switch 154 is provided resulting in less reflected power imbalance back into the power source which feeds in through the line terminals L1, L2. A snubber capacitor 162 also is sized in conjunction with the inductance of the reactor 160-1 to minimize any transient voltage spikes and the like which might cause losses, and to assure power switch (e.g., thyristor) commutation. D.c. power 172 for operation of the attendant circuits which make up the essence of the performance computer is derived from the a.c. power line through a d.c. power supply 170.

Figure 4:
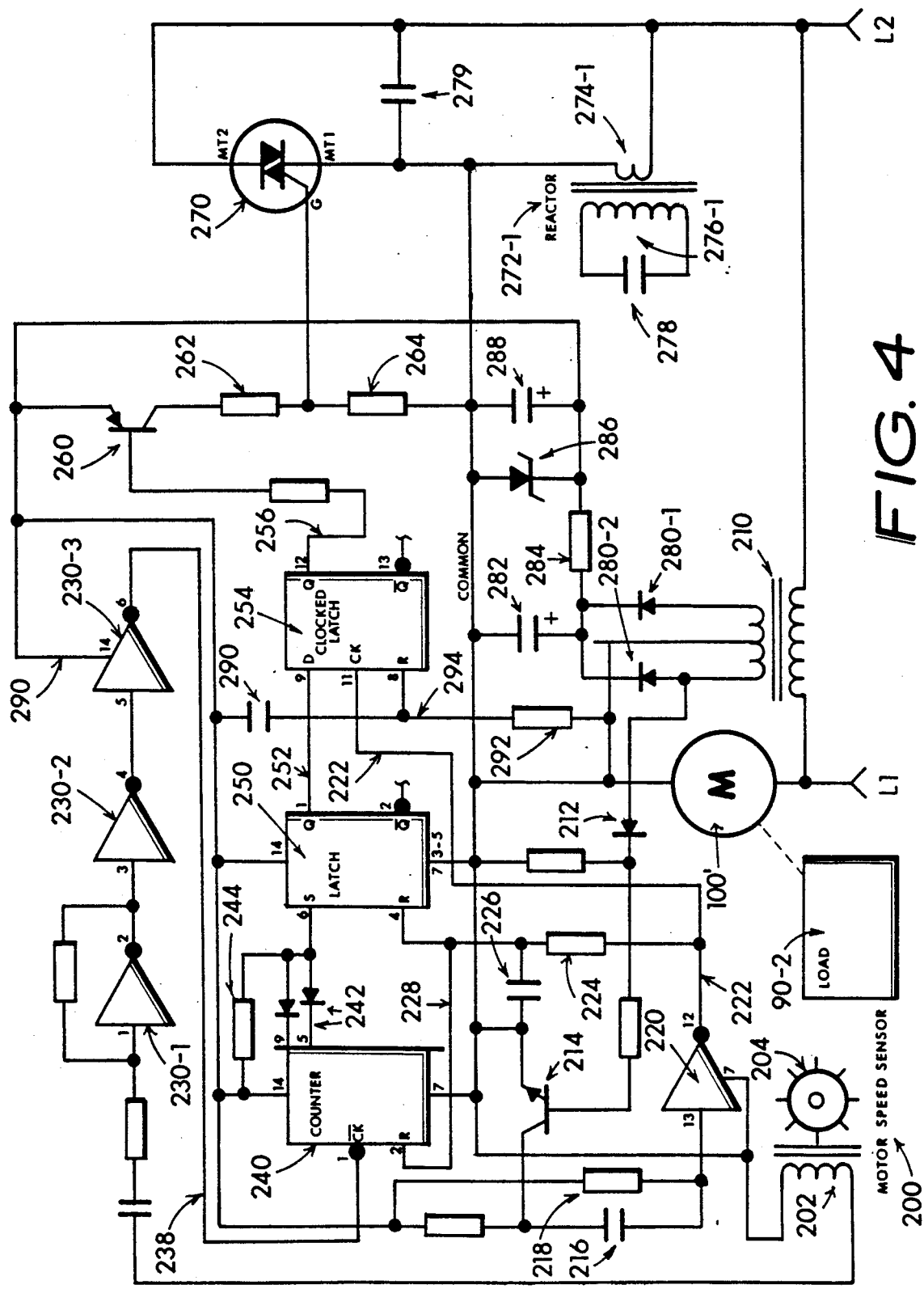
FIG. 4—Schematic for circuit based upon FIG. 3 block diagram.

An electrical diagram for a suitable embodiment of my invention appears in FIG. 4, which includes an induction motor 100' coupled with a load 90-2. A motor speed sensor having a pickup coil 202 and a reluctor 204 is coupled with the motor's rotor shaft. As the motor's rotating member spins, movement of the attached reluctor induces an a.c. signal in the stationary coil 202 having a frequency which changes in proportion to motor speed variations.

Figure 5:
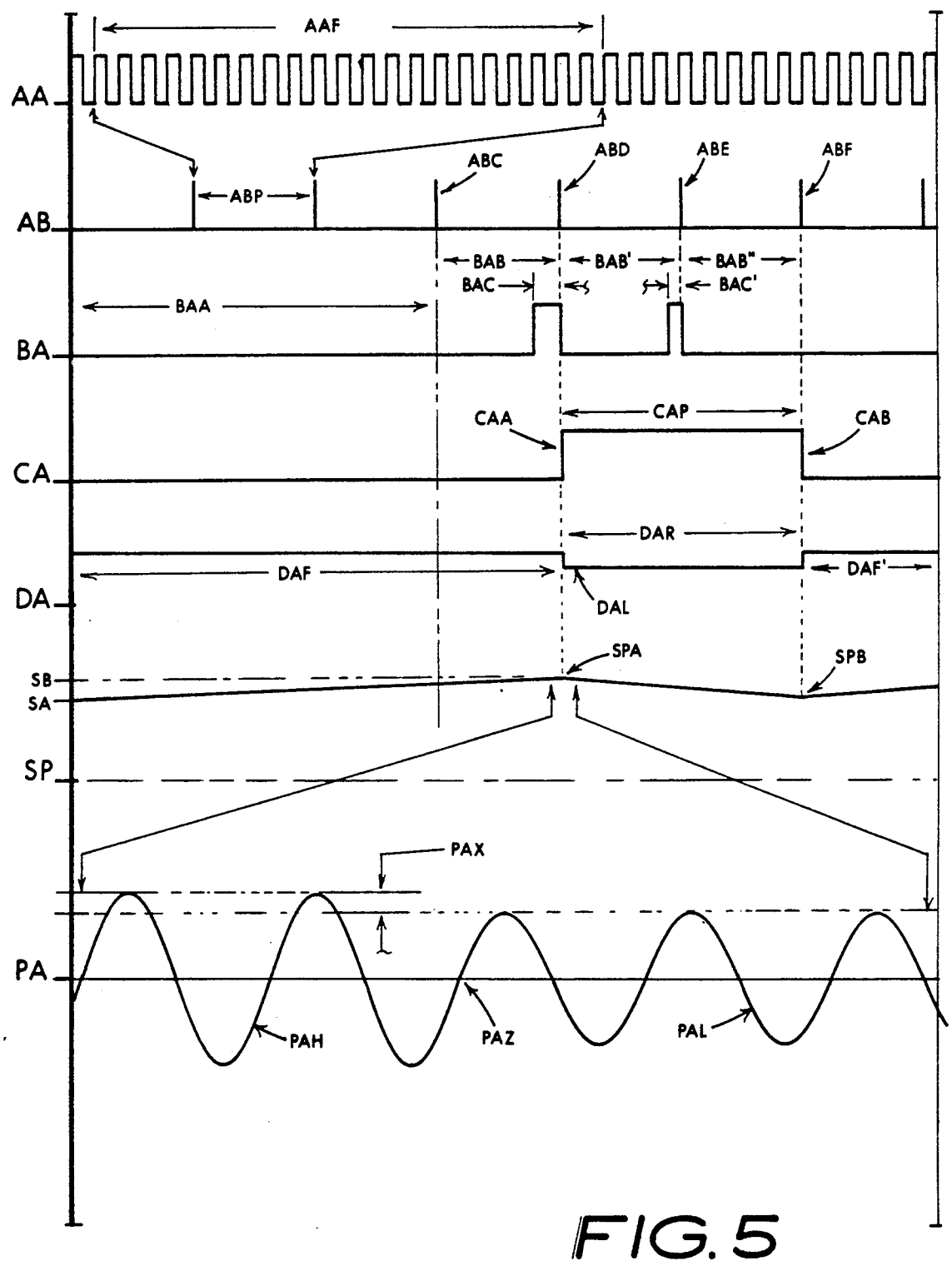
FIG. 5—Waveforms associated with circuit of FIG. 4 showing operating levels.

60-hertz clock pulses for line-synchronized circuit timing are derived from the a.c. power line frequency by utilizing the a.c. signal produced on the secondary of a small power transformer 210. A diode 212 steers line frequency (e.g., 60-hertz) signal pulses to the the base of a NPN transistor 214. In effect the combination of the diode and transistor form a rudimentary but effective zero-cross detector which causes the collector of the transistor 214 to alternate HIGH and LOW. Differentiation of the collector pulses is produced by the capacitor 216 and resistor 218. Typically, these components may be about 2.7 nanofarad and 10-K ohms respectively. The result is a short-duration spike-like negative pulse on the input of inverter 220 which in turn results in a positive 60-hertz clock pulse on line 222 that is synchronized with the voltage phase of the power line frequency, as depicted by waveform AB in FIG. 5. A 6.8-K resistor 224 and 150 picofarad capacitor 226 act as an integrator producing a delayed clock pulse on line 228.

In one model version of this invention, I provided the reluctor as a gear wheel having 44-teeth. The result was that, for a motor speed in the range of 1,700–1,735 r.p.m. the frequency of the signal produced by the sensor was in the range of 1,246–1,272 hertz. The output of the sensor 202 couples with cascaded amplifiers 230-1, 230-2, 230-3 which build-up the signal into a pulse train signal at the output of the third inverter/amplifier 230-3 (as depicted by waveform AA in FIG. 5) that couples with the clock input of a counter 240. The counter output is decoded by diodes 242 to effect a HIGH signal at the SET input of latch 250 if at least 21 clock pulses arrive at the counter clock input between each 16.67 millisecond counting period established by the recurrent 60 hertz clock rate reset pulse (waveform AB) appearing on line 228. You will realize that when the motor is running at a speed somewhat greater than about 1,718 r.p.m. the resulting sensor frequency of about 1,260 hertz results in the 21 pulses. In other words, if the motor speed is less than about 1,718 r.p.m. the SET input of latch 250 remains LOW as depicted by portion BAA of waveform BA in FIG. 5, while if the motor speed is greater than about 1,718 r.p.m. the SET input of latch 250 is driven HIGH resulting in a HIGH level on the Q output of the latch as depicted by portion BAC of the BAB portion of waveform BA. A "D" flip-flop register 254 receives the signal on line 252 and transfers its instant level to the Q output line 256 as depicted by portion CAP of waveform CA in FIG. 5 coincident with the positive-rising edge of the clock pulse on line 222 and as depicted by the waveform CA transistion CAA, while the slightly delayed clock pulse on line 228 resets the counter 240 and latch 250.

When the motor 100' is lightly loaded, it will ordinarily speed-up and exceed the 1,718 r.p.m. value with the result that a HIGH output appears on line 256 that couples with the base of a PNP transistor 260. As such, the PNP transistor 260 remains OFF. Under this condition, the triac 270 remains OFF and the motor 100' receives a.c. line power through the primary winding 274-1 of the reactor 272-1. A voltage drop ordinarily on the order of 15-25 volts (with a 117 volt motor) is produced, reducing the power coupled with the motor by a level DAL for the period represented by portion DAR of waveform DA in FIG. 5. Such a reduction in power applied to the motor has been shown to result in an overall energy saving of 20-30%.

When the motor 100' load increases and it slows down due to the additional loading, the motor speed will slip below 1,718 r.p.m. with the result that a LOW output appears on line 256 that couples with the base of the PNP transistor 260. The transistor will turn-ON, pulling the collector HIGH with the result that the level at the juncture of resistors 262, 264 is sufficiently HIGH to drive the triac 270 gate and turn the triac ON. When the triac is ON, the voltage drop across the reactor winding 274-1 disappears due to the shunting effect of the triac. The result is that essentially FULL line power is applied to the motor as depicted by portion DAF of waveform DA, giving it the extra torque necessary to drive the increased load and regain the motor's nominal operating speed (as depicted by the change in the speed levels SA to SB of waveform SP shown in FIG. 5). As the applied motor power is decreased during period DAR the motor speed will decrease from a rate SPA to SPB, whereupon the counter will again receive insufficient pulses to produce the HIGH level on line 252 with the result that the clocked latch output line 256 is driven LOW (waveform CAB) coincident with the leading edge of clock pulse ABF. The cyclic decrease/increase in mechanical motor speed caused by changes in applied motor power under different conditions of loading continues to repeat, with the cyclic rate of recurrance ordinarily having a period considerably in excess of 16.67 milliseconds due to the flywheel effect inertia of the motor's rotor mass combined with the driven mechanical load.

The following BASIC language computer program can be used to quickly find the actual operating speed at which the motor will run when used with any reluctor wheel having between 10 and 300 teeth:

```
10 REM PROGRAM TO DETERMINE COUNTER/DECODER STATES          DECOD-1.BAS V1.02
20 REM                                                      (c) H. Weber K1VTW 9/9/89
30 REM
40 PRINT CHR$(27)+"[2J"+CHR$(27)+"[f"    ' ANSI CLear Screen and Home Cursor
50 PRINT "Enter NOMINAL Motor Speed:     ";:INPUT MS
60     IF MS<1000 OR MS>3600 THEN 50
70 PRINT "Enter RELUCTOR Teeth Number:   ";:INPUT TN
80     IF TN<10 OR TN>300 OR TN<>INT(TN)   THEN 70
90 RS=MS/60:FS=RS*TN:DX=FS/60
100    IF DX-INT(DX)<.5 THEN FA=0 ELSE FA=1
110       DY=INT(DX)
120       FX=DY*60:RX=FX/TN:MX=RX*60
130    IF FA=0 THEN 160
140 PRINT:PRINT "Speed Signal Frequency is:      ";FS
150 PRINT "Calculated DECODER Factor is:      ";DX
160 PRINT:PRINT "Using an ACTUAL DECODER FACTOR of ";DY
170 PRINT "produces a MOTOR SPEED of:     ";MX "r.p.m.
180    IF FA=1 THEN DY=DY+1:FA=0:GOTO 120
190 PRINT:PRINT:END
```

In the mentioned example, the computer screen displays the following information:

| | |
|---|---|
| Enter NOMINAL Motor Speed: ? | 1725 |
| Enter RELUCTOR Teeth Number: ? | 44 |
| Using an ACTUAL DECODER FACTOR of | 21 |
| produces a MOTOR SPEED of: | 1718.18 r.p.m. |

The 60-hertz clock signal on line 222 serves to produce changes in the state of line 256 on every-other a.c. power half cycle at most: the result is integral full-cycle power control by the triac switch 270 and less assymetrical distortion of the a.c. power waveform. A capacitor 278 coupled with the reactor secondary 276-1 acts as a snubber to further smooth any waveform distortions or transients which might be introduced by the triac's switching action, and mainly to enhance triac commutation.

Initalization of the latch 254 is provided by a power-up reset circuit including capacitor 290 and resistor 292 which produce a HIGH level on the latch RESET line 294 briefly when power is first turned-ON. The intent is to establish an initial LOW level on line 256, and immediately turn the triac 270 ON until the motor has started and is running near operating speed.

D.c. power for circuit operation is derived from the transformer 210 secondary through rectifier diodes 280-1, 280-2 which charge a capacitor 282 to nominally about 16 volts. a ballast resistor 284 delivers current to charge capacitor 288 which is maintained at a lesser d.c. level through the voltage regulating action of a small zener diode 286. The result is about 6 volts d.c. on line 290 for operation of the integrated circuit logic devices.

Figure 6:
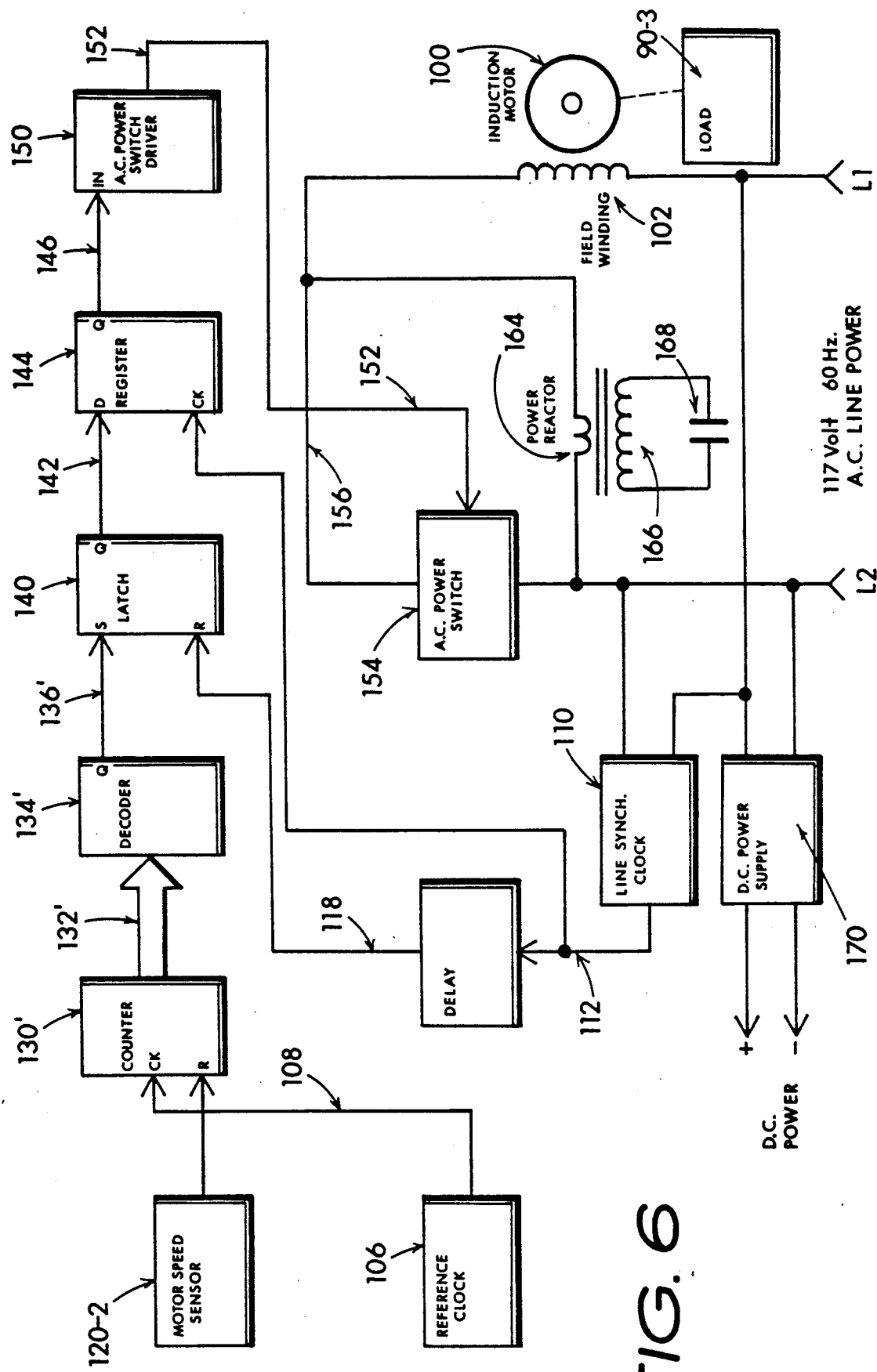
FIG. 6—block diagram for alternate configuration of slip speed type of energy controller.

In FIG. 6 I show a variation of my controller which is suitable for use with a motor speed sensor 120-2 that produces only one (or just a few) pulses for each motor 100 shaft rotation. In the earlier FIG. 3 and 4 description, I said that a 44-tooth gear wheel had been used with the sensor 200. In this version, the sensor 120-2 may produce merely 1 pulse per motor shaft rotation. For a typical 3,450 r.p.m. motor, the result is a 57.5 hertz frequency signal produced by the sensor 120-2 that is indicative of instant motor speed.

A counter 130' is fed with clock pulses produced on line 108 by a reference clock source 106. A decoder 134' produces a HIGH level on line 136' whenever the pulses delivered by the counter 132' exceed a predetermined binary weight. The rest of the circuitry elements including the latch 140, register 144, and so forth operate as said for FIG. 2 with the notable difference being the use of a transformer type power reactor having a winding 164 hooked in series between the motor 100 and the a.c. line terminal L2. The reactor includes a secondary 166 and a capacitor 168 which together act to damp any switching transients which might be introduced by the switch 154, and generally to improve the operating waveform of the apparatus.

Figure 7:
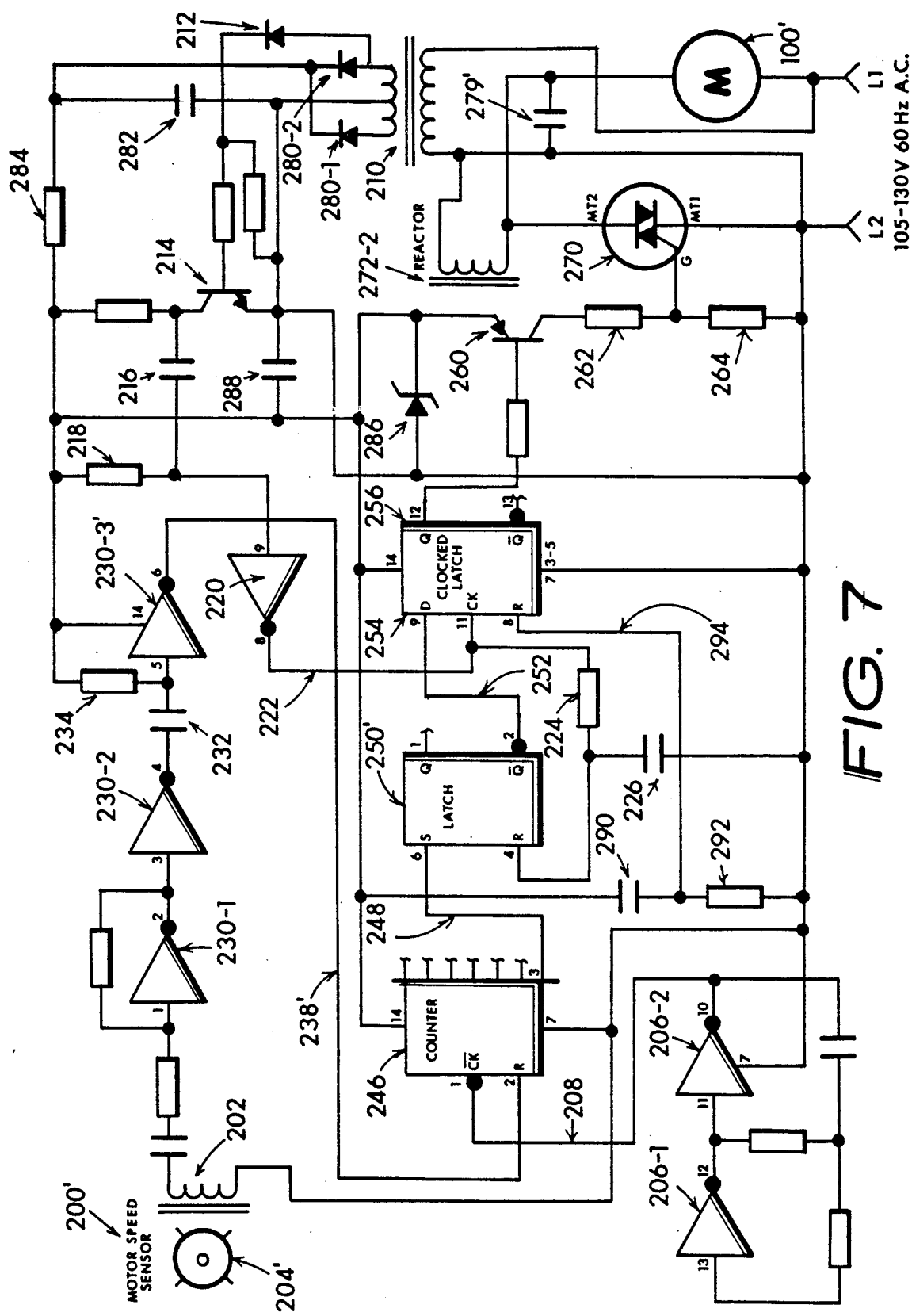
FIG. 7—Schematic for circuit based upon FIG. 6 block diagram.

In FIG. 7 I show the speed sensor 200' to include a toothed wheel 204' and a pickup coil 202. In practice, I have found that the electronic ignition pickup sensor assembly used in Chrysler automobile applications has been satisfactory. It is also of proven reliability and inexpensive, and demostrates the commercial feasibility of my device. Coupling this pickup with the motor scavanged from a hermetic compressor assembly used in a Westinghouse domestic refrigerator (marked D50A06T37CN) and deriving one pulse per motor shaft rotation, I have obtained a demonstrative set of operating conditions for the overall circuit. Picking 3,436 r.p.m. nominal speed, my sensor produces a 57.267 hertz frequency signal as coupled through amplifiers 230-1, 230-2 (CD4069BE integrated circuit). A capacitor 232 and resistor 234 coupled between the output of inverter 230-2 and input of inverter 230-3' differentiates the speed signal, thereby producing a spike-like positive pulse signal on line 238' having a pulse width of about 300–500 nanoseconds (waveform AD of FIG. 8) which serves to periodically RESET the 7-stage binary counter 246 which may be a C-MOS CD4024BE integrated circuit. Inverters 206-1, 206-2 operate together as an oscillator to produce a clock signal on line 208 (waveform AC of FIG. 8). For purpose of illustration, the frequency of the signal produced on line 208 may be determined by the following BASIC routine:

```
10 REM  CLOCK FREQUENCY DETERMINATION (FIG. 7)           CFD-1.BAS V1.02
20 REM                            MBASIC                 (c) H. Weber K1VTW 9/9/89
30 PRINT CHR$(27)+"[2J"+CHR$(27)+"[f"                    ' ANSI screen control functions
40 PRINT "Enter LOADED MOTOR SPEED:                      ";:INPUT MSL
50     IF MSL<1000 OR MSL>3600 THEN 30
60 PRINT:PRINT "HOW MANY STAGES in Counter 246           ";:INPUT CNS
70     IF CNS<>INT(CNS) OR CNS<2 OR CNS>21 THEN 60
80 FCK=(MSL/60)*(2^(CNS-1))
90 PRINT:PRINT:PRINT "CLOCK SIGNAL FREQUENCY should be:  ";FCK;" Hertz"
100 PRINT:PRINT:END
```

Which will (when entering the mentioned values) produce the following video display:

| | |
|---|---|
| Enter LOADED MOTOR SPEED: ? | 3436 |
| HOW MANY STAGES in Counter 246 ? | 7 |
| CLOCK SIGNAL FREQUENCY should be: | 3665.07 Hertz |

When the motor is running slower than about 3,436 r.p.m. the counter will advance sufficiently that a HIGH level is produced on the counters Q7 output line 248 (waveform BB of FIG. 8) that couples with the SET input of latch 250'. The SET-forced LOW level produced on the latch /Q output line 252 couples with the "D" input of the clocked latch 254. Each latch may be a portion of a CD4013BE integrated circuit. 60-hertz clock pulses on line 222 transfers the "D" input state to the latch Q output line 256 (waveform CB of FIG. 8), and the base of PNP transistor 260 which is then turned-ON. As a result, triac 270 is turned ON and shunts the reactor 272-2' with the result that nearly full line voltage (portion DBF of waveform DB) appears across the motor 100' windings. The motor torque increases and the motor speeds-up (depicted by region of waveform SR between SRA and SRB). Ultimately motor speed-up may be sufficient (e.g., level SC at point SRB) that the speed signal pulses produced on line 238' recur prior to counter 246 having counted-UP sufficiently to produce a HIGH level on line 248 at any time between reset pulses. The overall result is that the maintained-LOW level on line 248 is transferred through the latches 250', 254 and ultimately a HIGH level is delivered to the base of PNP transistor 260, turning it OFF. As a result the triac 260 is turned OFF at the next a.c. power half-cycle zero crossover and any voltage drop developed across the reactor 272-2' winding is effectively in series with the power delivered to the motor 100' windings, and the a.c. level is reduced as a shift from the waveform PB level PBH to level PBL in FIG. 8. The reduced motor power reduces motor losses and is sustained for as long as the motor is lightly loaded, and does not slow-down below about 3,436 r.p.m.

Figure 8:
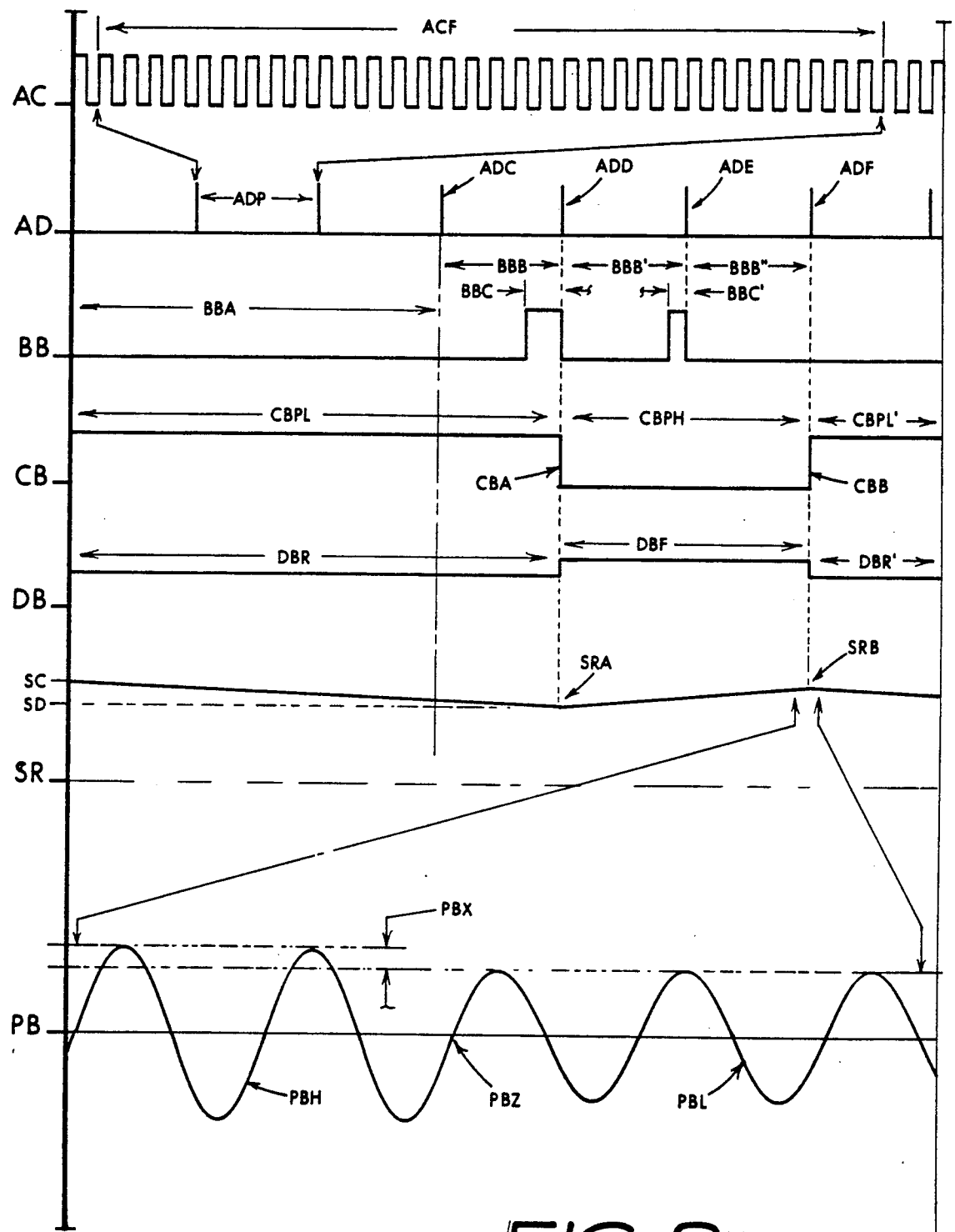
FIG. 8—Waveforms associated with circuit of FIG. 7 showing operating levels.

In FIG. 8 I show the several waveforms which are important to the operational understanding of FIG. 7, including the 31 pulses ACF comprising the clock signal pulse train AC which are decoded during period ADP between two successive speed pulses ADA, ADB (and which repeat between each successive pulse pair ADC, ADD, ADE, ADF). Waveform BB shows a period BBA during which the motor is lightly loaded and motor speed is fast enough to prevent decoding of clock signal pulses. Then in the period between speed pulse ADC and ADD, the clock pulses "count up" sufficiently during period BBB to produce a rise in the BB pulse. The period of the pulse BBC is determined as the time between when decoding produces the pulse setup, until the next speed pulse ADD occurs which resets the signal level of waveform BB to a LOW value. In a like way, the count-up of the clock pulses during period BBB' produces a pulse having a duration BBC'.

Then when the motor speeds up sufficiently, the speed pulses occur frequently enough to prevent decoding and during the period BBB" of waveform BB no pulse is produced. You will note that the output of the D flip-flop 256 is clocked on the edge of pulse ADD so as to produce a transistion of the CB signal subsequent to period CBPL from a HIGH to a LOW level for a period CBPH, whereupon the transistion of speed pulse ADF will produce a rise CBB of the waveform for the remaining period CBPL'. In a corresponding way, reduced power is applied to the motor during period DBR and DBR', whereas full power is applied during period DBF. The actual change in the motors applied a.c. power level changes from over the range PBX, with the actual change occurring only at "zero-crossover" of an integral cycle point PBZ. Thus said, each a.c. power cycle consists of two full half-cycles of equivalent level.

Figure 9:
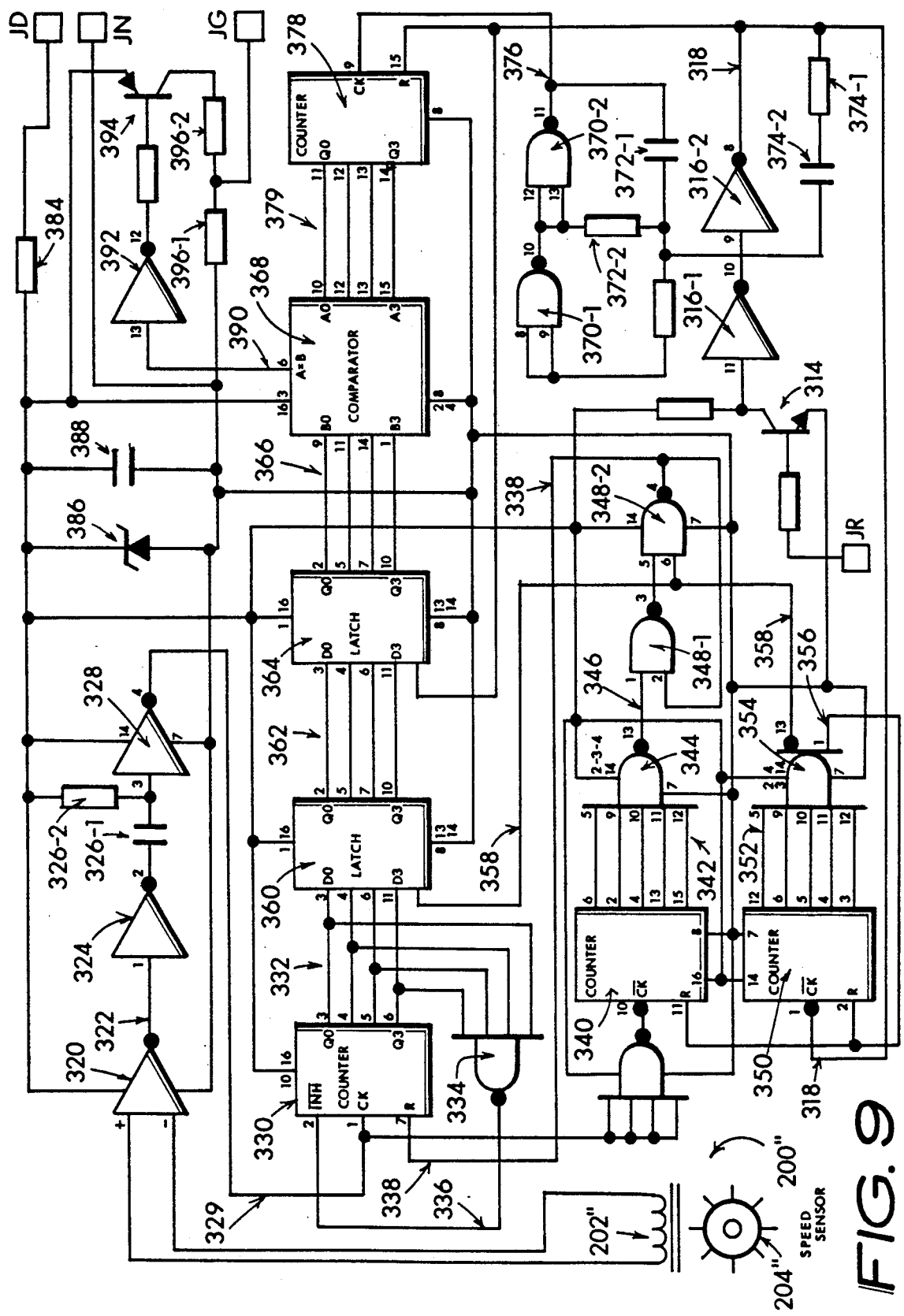
FIG. 9—Circuit for slip-speed sensor type of energy controller providing multilevel power modulation.
Figure 10:
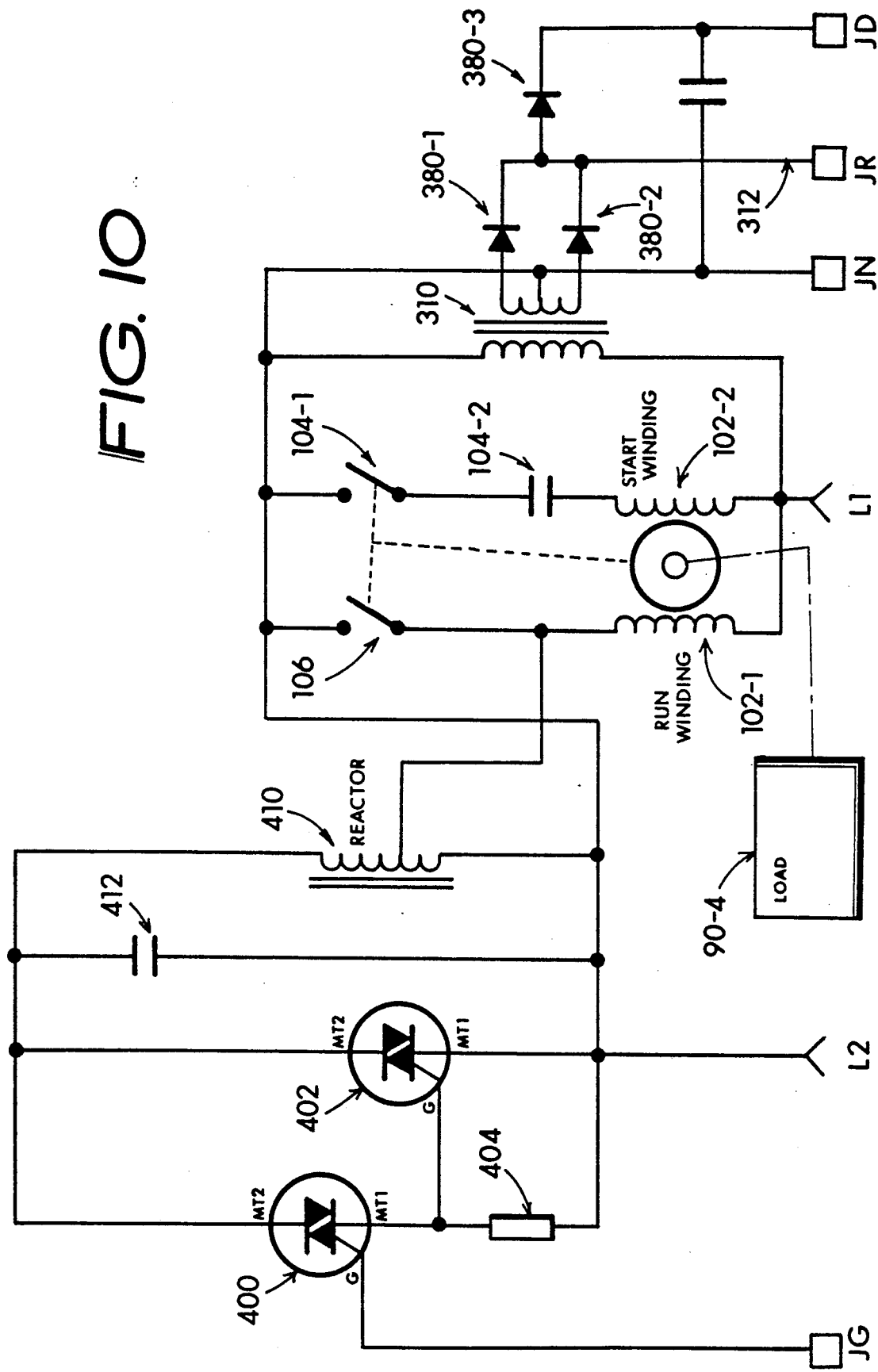
FIG. 10—Power control portion of circuit depicted in FIG. 9.

In FIG. 9 and FIG. 10 I show how proportional control of motor 100" power may be obtained. The speed sensor 200" produces a speed pulse signal from the pickup coil 202" that couples with the inputs of an operational amplifier 320, resulting in a speed pulse signal on line 322 that couples through inverter 324 and a differentiator network including capacitor 326-1 and resistor 326-2. The differentiator output couples through another inverter 328, producing a speed signal pulse on line 329 that couples directly with the CLOCK input of 4-stage binary counter 330 and through an inverter with the CLOCK input of a 12-stage binary counter 340. With the earlier mentioned 44-tooth chopper wheel 204", a 4-pole motor will produce a sensor signal frequency of about 1,246-1,272 r.p.m. for a motor speed of 1,700-1,735 r.p.m. At a nominal full-load motor speed of 1,718 r.p.m. a 1,260 hertz sensor signal frequency appears on line 329. The NAND gate 344 decodes the counter 340 output. NAND gates 348-1, 348-2 form a S/R latch. When the counter 340 counts to a value predetermined by the decoder 344 connections, a LOW pulse appears on line 346, setting the output of gate 348-1 HIGH, while the output of gate 348-2 is driven low thus enabling counter 330 which will proceed to count-UP. A second counter 350 is clocked by 120-hertz clock pulses appearing on line 318, with the counter outputs 352 decoded by the NAND gate 354. The NAND gate then produces a LOW level pulse on line 358 that couples with NAND gate 348-2 and resets the latch (under the condition where it was set by a pulse on line 346) every 16/120 (e.g., 0.134) second. A HIGH level is simultaneously produced on line 356 which serves to RESET counters 340 and 350. While the periodicity of reset may be changed through selection of the counter 350 count factor (in conjunction with decoder 354), I have found that the flywheel inertia of most fractional horsepower motor and load combinations is well enough matched to a decoder combination of 8 (0.067 sec.), 16, or 32 (0.267 sec.) to be neatly satisfied by a counter such as the well-known C-MOS type CD4024BE. The RESET input of counter 350 may, instead of being coupled with line 356, be coupled with line 338 with the result that all reset periods will be synchronized with the S/R latch set occurance and therefore reset will repeatedly take place the same period of time after the S/R latch is set: however I have found that the quasi-random nature of non-synchronized reset occurrence in the shown connections serves to thwart any tendency for motor speed hunting, or for sympathetic vibration which might be otherwise induced in some adjacent mechanical assemblage.

120-hertz clock pulses on line 318 are derived from a small power transformer 310 which couples with rectifier diodes 380-1, 380-2, 380-3. At the juncture of the cathodes of diodes 380-1, 380-2 with the anode of diode 380-3 a 120-hertz pulsating d.c. signal is delivered to connection JR in FIG. 10, which connects with corresponding connection JR in FIG. 9. In FIG. 9, the 120-hertz signal on connection JR couples with the base of a NPN transistor 314, with the resulting collector pulses coupled through cascade inverters 316-1, 316-2.

In FIG. 10 the a.c. power line couples through terminals L1, L2. As shown, power applied to terminal L1 feeds the RUN winding 102-1 and START winding 102-2 of a capacitor-start induction motor such as a General Electric model 54KH46JR15S appliance motor rated for ⅓ horsepower (nominally, 115 volts 7.9 amperes under full load). Power fed to the other line terminal L2 couples with centrifugual switches 104-1 for motor starting, and 106 for thyristor bypass. Both switches are CLOSED when the motor is at rest, and OPEN when the motor is running (near operating speed) as is usual practice with motors of this type. A transformer 310 is also connected between the a.c. power connections L1, L2 so as to produce about 24 volts in the secondary which is rectified by diodes 380-1, 380-2 and coupled through a steering diode 380-3 to charge a capacitor and deliver a d.c. power level to terminal JD. Line 312 that couples with terminal JR is unfiltered 120-hertz unipolar pulses which are utilized for synchronization by the circuit of FIG. 9.

Line terminal L2 also couples with terminal MT-1 of a power thyristor (e.g., a triac as shown), while the other power terminal MT-2 couples with a reactor 410. You will note that line L2 also connects with the (bottom) end of the reactor, while a tap on the reactor couples with the RUN winding 102-1 of the motor. It is the voltage drop which develops across this tapped portion of the reactor winding which introduces voltage drop in the run winding circuit, thus reducing the power applied to the motor. When a HIGH level is coupled into therminal JG, the gate of a smallish thyristor (such as a Teccor L401E3) receives current and turns the small thyristor ON, the result of which is a rush of current into the gate of the power thyristor (such as a Teccor Q4012L5), which is otherwise held OFF by the gate/MT-1 shunting effect of resistor 404. The gate current introduced into the power transistor 402 turns it ON, with the result that the reactor 410 winding is shunted (shorted-out) by the conductance of the thyristor. Through inductive coupling, which makes the overall winding appear as a shorted turn, the voltage drop otherwise developed between the (bottom) end of the reactor and the tap is reduced to a negligible level, resulting in about FULL power being coupled with the motor's RUN winding 102-1. You will realize that the use of the cascade use of the two thyristors 400, 402 results in considerable power handling capability which can be controlled by the small transistor (such as a 2N5197) of FIG. 9.

Figure 11:
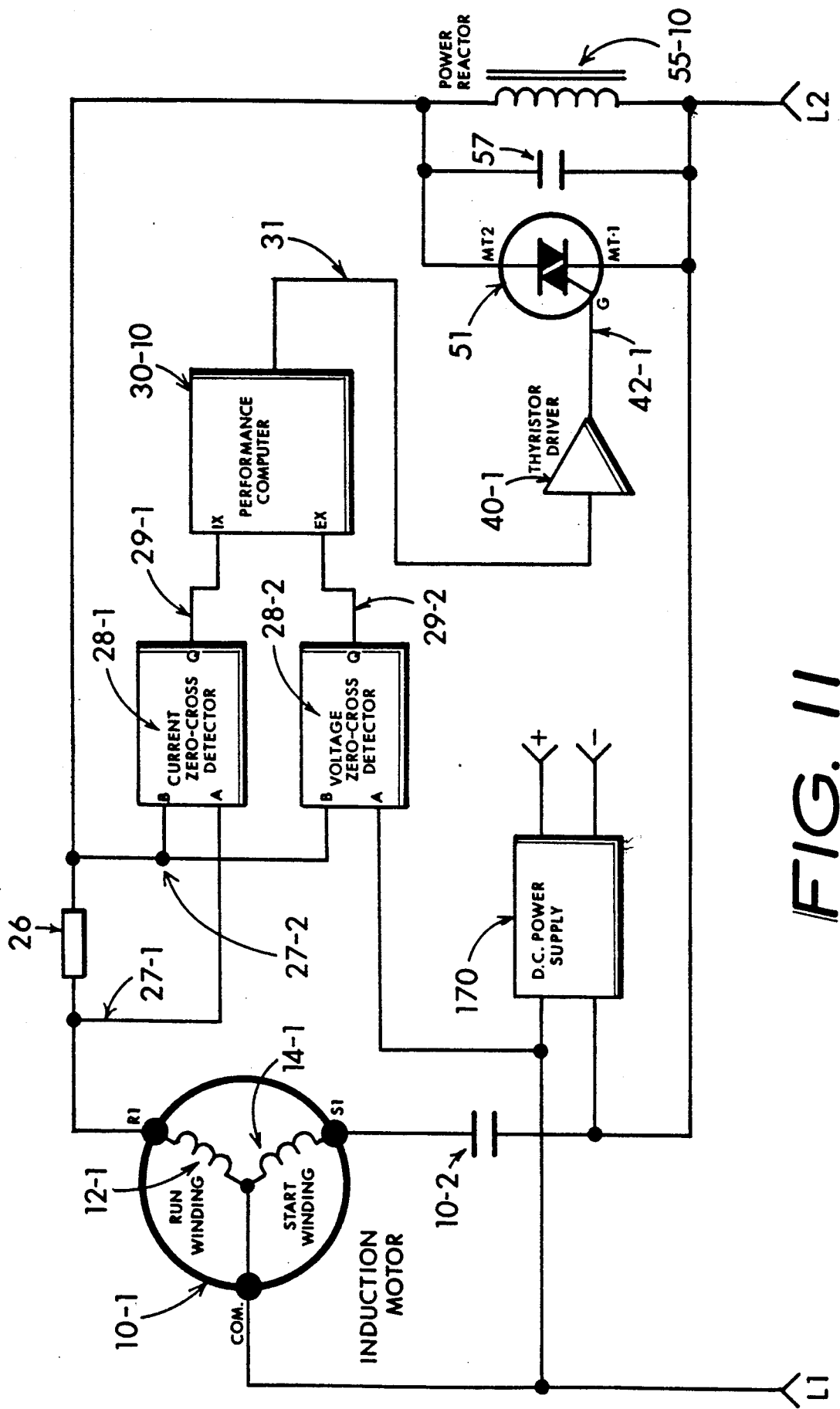
FIG. 11—Block diagram for controller employing power-factor changes as load sensor.

In FIG. 11 I show how lagging current phase of a.c. power flow can be utilized to determine a value of load signal and overall control of power flow to the induction motor's 10-1 RUN winding 12-1. A resistor 26 having a value of a few ohms or less couples in series with the RUN winding current path, thereby producing a voltage drop thereacross which is proportional to apparent current flow. The voltage phase of this developed voltage drop lags the phase of the instantaneous line voltage phase which appears between line terminals L1, L2 by an amount proportional to motor loading. Ordinarily, the voltage drop developed across the resistor 26 will lag by 45 or more degrees under no-load, and less than 45 degrees under full-load. A zero-cross detector 28-1 produces a pulse on line 29-1 which is indicative of the immediate phase of the motor's current phase, while a second zero-cross detector 28-2 produces a pulse on line 29-2 which indicates instaneous line voltage phase. It is the difference in timing between these two pulses which is processed by the performance computer 30-10 to deliver a signal on line 31 that, through the thyristor driver 40-1, produces a gate signal on line 42-1 coupled with the gate of the triac 51. When the motor is lightly loaded, timing of the pulse on line 29-1 will considerably lag the pulse on line 29-2. The result is that the gate signal coupled with the triac 51 will be delayed, and the triac turn-ON will be retarded during each half-cycle. As a result, considerable voltage drop (preferably on the order of 10-30% of available r.m.s. line voltage) will develop across the power reactor 55-10, resulting in reduced motor run winding excitation. When motor loading increases, either by virtue that the a.c. power has been reduced for a few cycles and whatever flywheel effect persists in the rotor mass is overcome and allows the motor to slow-down or slip most of the motor current from the transformer 500 making its construction conventional, and having the damping effect of the resistor 501 serving to minimize deleterious "inductive effects" of having used the transformer alone. An a.c. voltage value develops in the transformer 500 secondary having a phase which lags the line voltage phase coupled between terminals L1, L2. This induced voltage is rectified by diodes 502-1, 502-2 thereby developing a 120-hertz (for 60-hertz power line frequency) signal at juncture 504 that couples through a resistor with the base of NPN transistor 506. The transistor serves as a zero-cross pulse detector: the transistor is OFF only briefly during each a.c. half-cycle when the 120-hertz signal level appearing at juncture 504 is less than about +0.7 volts. The result is a short duration positive pulse developed at the juncture of resistor 508-1 with the transistor 506 collector. Capacitor 508-2 and resistor 508-3 (having values of say 680 picofarads and 22-K ohms) make up a differentiating network which enables the inverter (e.g., CD4069B i.c.) to deliver a narrow spike-like pulse on line 512 that coincides with the trailing edge of the pulse produced at the transistor 506 collector. This pulse serves to SET latch 530, resulting in a LOW level on line 532 that couples with the RESET input of a counter 534. A clock oscillator including CMOS inverters 540-1, 540-2 delivers a signal on line 542 having a frequency, which may be determined from the BASIC routine:

```
0 REM        CLOCK FREQUENCY DETERMINATION                                    CKF-1.BAS V1.02
0 REM                                                      MBASIC             (c) H. Weber 9/7/89
0 PRINT CHR$(27)+"[2J"+CHR$(27)+"[f"                                  ' ANSI screen control functions
0 PRINT "Enter LINE FREQUENCY (Hertz):                                        ";:INPUT LF
0     IF LF<50 OR LF>400 THEN 30
0 PRINT:PRINT "     FULL LOAD MOTOR CURRENT LAG (DEGREES):                    ";:INPUT PL
0     IF PL<10 OR PL>160 THEN 60
0 PRINT:PRINT "  COUNTER (element 534) STAGES:                                ";:INPUT NC
0     IF NC<2 OR NC>21 OR NC<>INT(NC) THEN 80
00 FCK=(180/(180-PL))*LF*2  (NC-1)
10 PD=(1/(2*LF))*((180-PL)/180)*1000
20 PRINT
30 PRINT "       LOW PULSE DURATION (on line 532)                             "PD" milliseconds"
40 PRINT:PRINT "     CLOCK FREQUENCY SHOULD BE ABOUT                          "FCK" Hertz"
50 PRINT:PRINT:END
``` a bit more, or actual loading is increased, the apparent current phase will lag less, producing a signal on line 29-1 with timing that lags the signal on line 29-2 less. As a result the triac 51 is turned-ON earlier in each a.c. power half-cycle thereby shunting the power reactor 55-10 and delivering a higher average level of line power excitation to the run winding 12-1 thereby increasing motor torque and, resultingly, motor speed.

Figure 12:
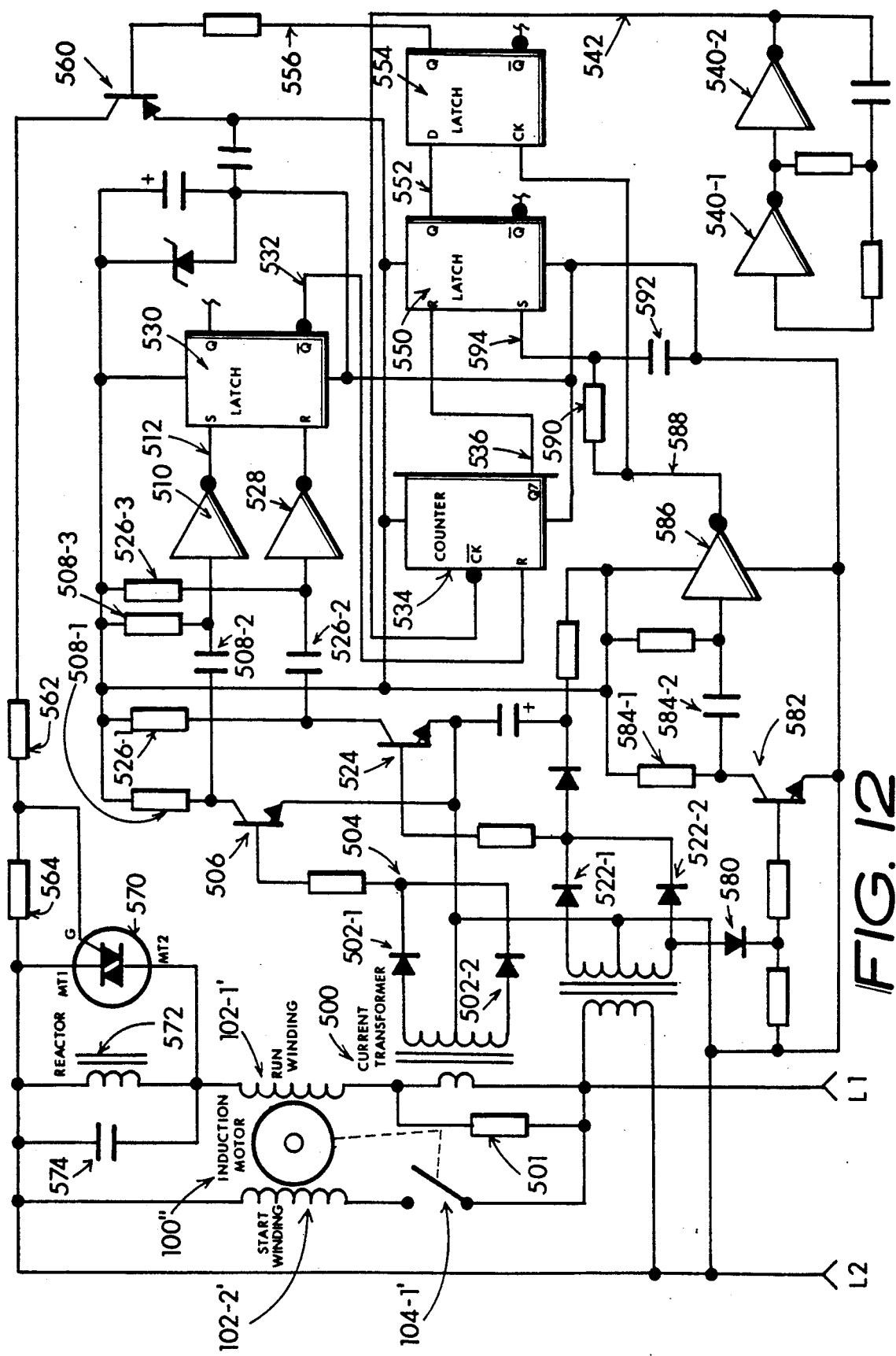
FIG. 12—Schematic for circuit based upon FIG. 11 block diagram.

In FIG. 12 I show a circuit implementation of a controller which utilizes instantaneous power factor changes to produce motor power modulation. The motor 100", which includes a start winding 102-2' and starting switch 104-1', has a run winding 102-1' that hooks in series with a resistor 501 having a value on the order of ½ ohm. Say if the motor draws 4 amperes, about 2 volts develops across the resistor, which in turn couples with the primary of a small transformer 500. It is important to note that the use of the resistor 501 diverts which (as an example) will provide on the video display:

```
Enter  LINE FREQUENCY (Hertz): ?                         60
       FULL LOAD MOTOR CURRENT LAG (degrees): ?          25
       COUNTER (element 534) STAGES: ?                   7
       LOW PULSE DURATION (on line 532) ?                7.17593 milliseconds
       CLOCK FREQUENCY SHOULD BE ABOUT                   4459.35 Hertz
```

A.c. line voltage phase is determined by obtaining a 120-hertz signal from the juncture of the diode 522-1, 522-2 cathodes that couples with the base of NPN transistor 524. The collector of the transistor, together with pullup resistor 526-1 develops a 120-hertz pulse signal that is differentiated by the combination of capacitor 526-2 and resistor 526-3 to deliver a pulse signal on line 528 that couples with the RESET input of latch 530. The result is that the level on line 532 is held LOW for a period of time between the occurence of the lagging current pulse and the next line voltage phase pulse (which serves as the zero-reference time pulse). With 60 hertz power, a −40 degree current lag results in a LOW pulse on line 532 having a period of 6.48 milliseconds, while a current lag of −50 degrees results in a period of 6.02 milliseconds: thus for a representative nominal current lag of −35 degrees the pulse duration is 6.71 milliseconds and the clock frequency Fck on line 542 is best set for 4,767 hertz with the counter being a 7-stage CMOS type CD4024B, as computed by the preceding BASIC programette to show:

| Enter | | | |
|---|---|---|---|
| | LINE FREQUENCY (Hertz): ? | 60 | |
| | FULL LOAD MOTOR CURRENT LAG (degrees): ? | 35 | |
| | COUNTER (element 534) STAGES: ? | 7 | |
| | LOW PULSE DURATION (on line 532) ? | 6.71296 | milliseconds |
| | CLOCK FREQUENCY SHOULD BE ABOUT | 4766.9 | Hertz |

If the current phase lag lessens, as when motor load increases, the pulse duration increases: and when phase lag is less than −35 degrees (say, −31 degrees for example) the counter 534 advances sufficiently to produce a HIGH level from its Q7 output hooked to line 536, thereby RESETing latch 550 delivering a LOW level on line 552. A 60-hertz synchronization signal is obtained through diode 580 which couples fundamental line frequency pulses to the base of NPN transistor 582, thereby developing 60-hertz pulses at the juncture of the transistor collector with pullup resistor 584-1 and differentiating capacitor 584-2 that together with inverter 586, delivers a narrow 60-hertz pulse developed on line 588 to the CLOCK input of the D-type latch 554 (such as a CMOS type CD4013B). The result is the level on line 552 is conveyed to line 556 on every-other a.c. power half-cycle zero crossover thereby assuring integral cycle operation of the overall controller operation. A slight delay of the synchronization pulse on line 588 is produced by the integrating network including resistor 590 and capacitor 592 (say, 10-K ohms and 220 picofarads respectively) with the result that SET of the latch is produced subsequent to data transfer through the edge-triggered latch 554. When the signal on line 552 is determined to be LOW (as was said in the preceding example), the transistor 560 is turned-ON thereby delivering gate current through resistor 562 across the triac 570 gate (and resistor 564). The thyristor turns-ON, shunting any voltage drop developed across the reactor 572, which together with buffer capacitor 574 otherwise bring about a 10-30% voltage drop of power delivered to the motor RUN winding 102-1'. The increased power causes the motor to "speed up" and the current phase lag increases, causing a narrowing of the pulse duration of the signal on line 532 with the result that on a subsequent a.c. cycle the counter 534 does NOT count-UP sufficiently to deliver a HIGH state on line 536 and the result is that the triac 570 does not turn-ON during any portion of the cycle. Subsequently, voltage drop permitted across the reactor 572 causes the motor to "appear" to be more heavily loaded, with it slowing down slightly and thereby bringing about a decrease in motor current phase lag.

Figure 13:
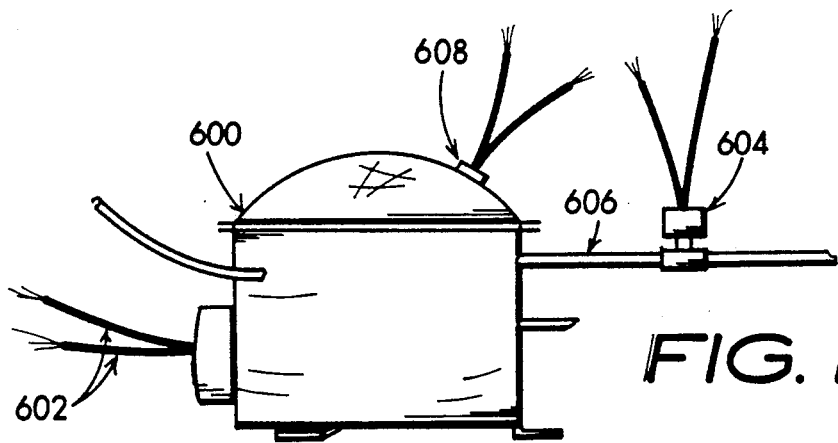
FIG. 13—Hermetic compressor motor having pressure or vibration sensors as speed pickups.
Figure 14:
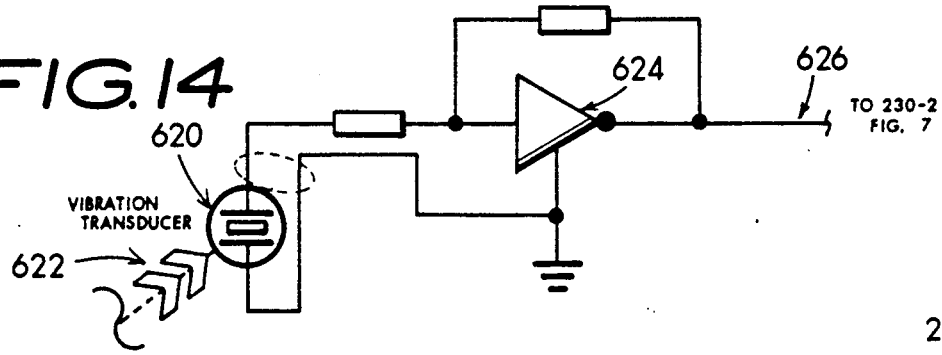
FIG. 14—Circuit detail for vibration sensor connection with circuit of FIG. 7.

Hermetic compressor motors of the kind used in refrigerators and more importantly, air conditioners may benefit from the aftermarket utilization of my invention through the expedient of indirectly measuring motor speed through sensing compression impulses produced by the compressor. In FIG. 13 I show a representative hermetic compressor 600 that includes a.c. power connections 602 for the integral induction motor. A considerable treatise on this kind of unit may be found in "Modern Refrigeration and Airconditioning" by Andrew D. Althouse, et al, published by Goodheart-Willcox Company Inc. (ISBN 0-87006-340-5, under chapter 4-25 "Hermetic Compressors". The hermetic compressor includes a "compression" line 606 to which I show a pressure-change transducer 604 affixed. The transducer responds to regular fluctuations in pressure and produces an a.c. signal which represents these fluctuations, having a frequency which is proportional to motor r.p.m. multiplied by the number of compression impulses produced by each rotation of the motor shaft. Similarily, a vibration pickup 608 affixed to the hermetic compressor housing (such as by bonding with an epoxy cement) can detect fundamental vibrations caused by compression impulses resulting in a signal which may be used to derive motor speed to operate a control circuit such as earlier depicted in FIG. 7. FIG. 14 shows such a vibration transducer 620 that responds to mechanical vibrations (symbolized 622) delivering a signal to an amplifier 624 that produces a signal on line 626 suitable for coupling with the input of amplifier 230-2 of FIG. 7.

Figure 15:
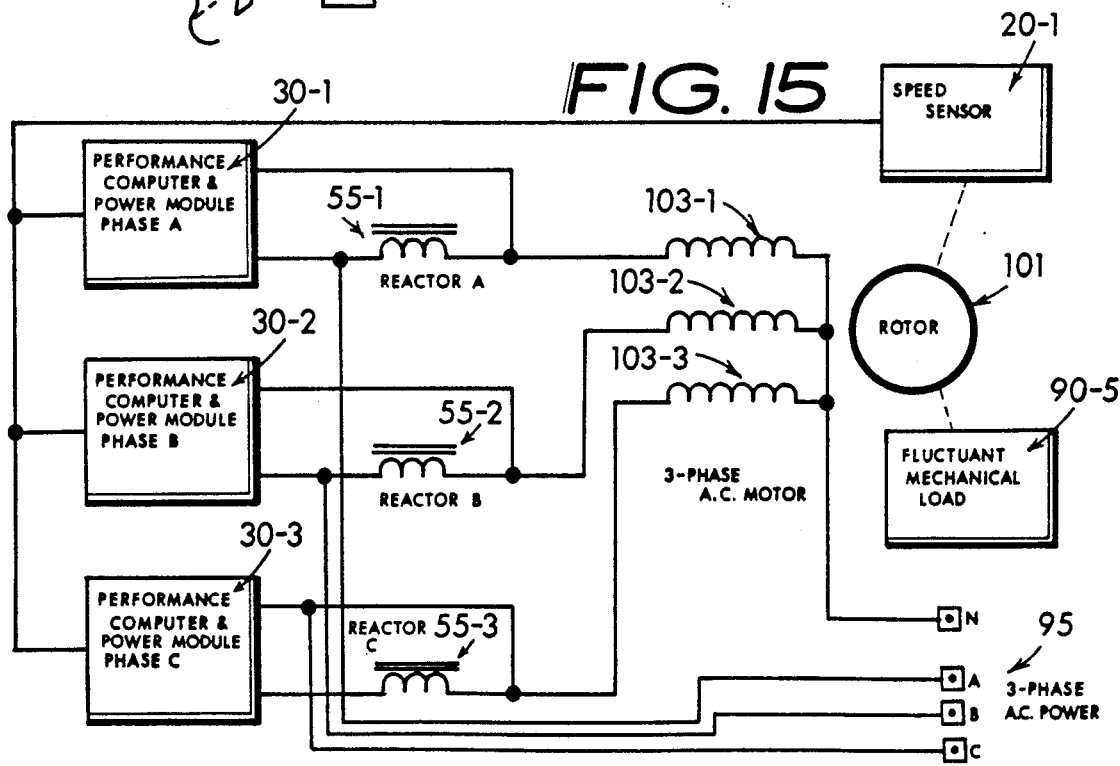
FIG. 15—Three-phase motor having energy saving controller operation.

Three-phase motors, comprising a rotor 101 driving a load 90-5 and having several RUN windings 103-1, 103-2, 103-3 may fully benefit from my invention through a hookup such as now shown in FIG. 15. A speed sensor 20-1 couples with the motor (such as a Westinghouse type 327P243) which may operate at a nominal 1,725 r.p.m. under load. Three performance computers 30-1, 30-2, 30-3 generally employing the principles of operation said for FIGS. 3 and 6 provide control of the reactors 55-1, 55-2, and 55-3 to modulate the 3-phase a.c. power brought in through terminals 95.

Figure 16:
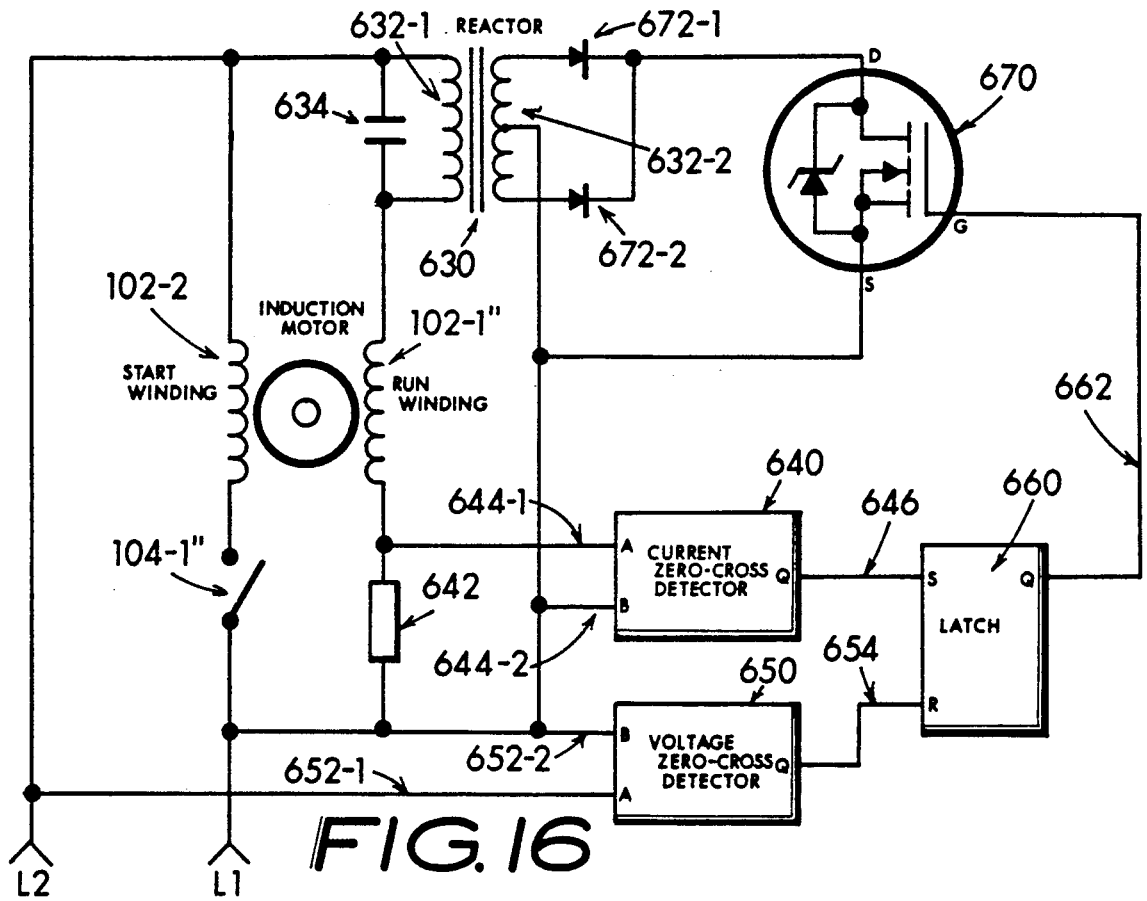
FIG. 16—Controller using MOSFET switch for power control.
Figure 17:
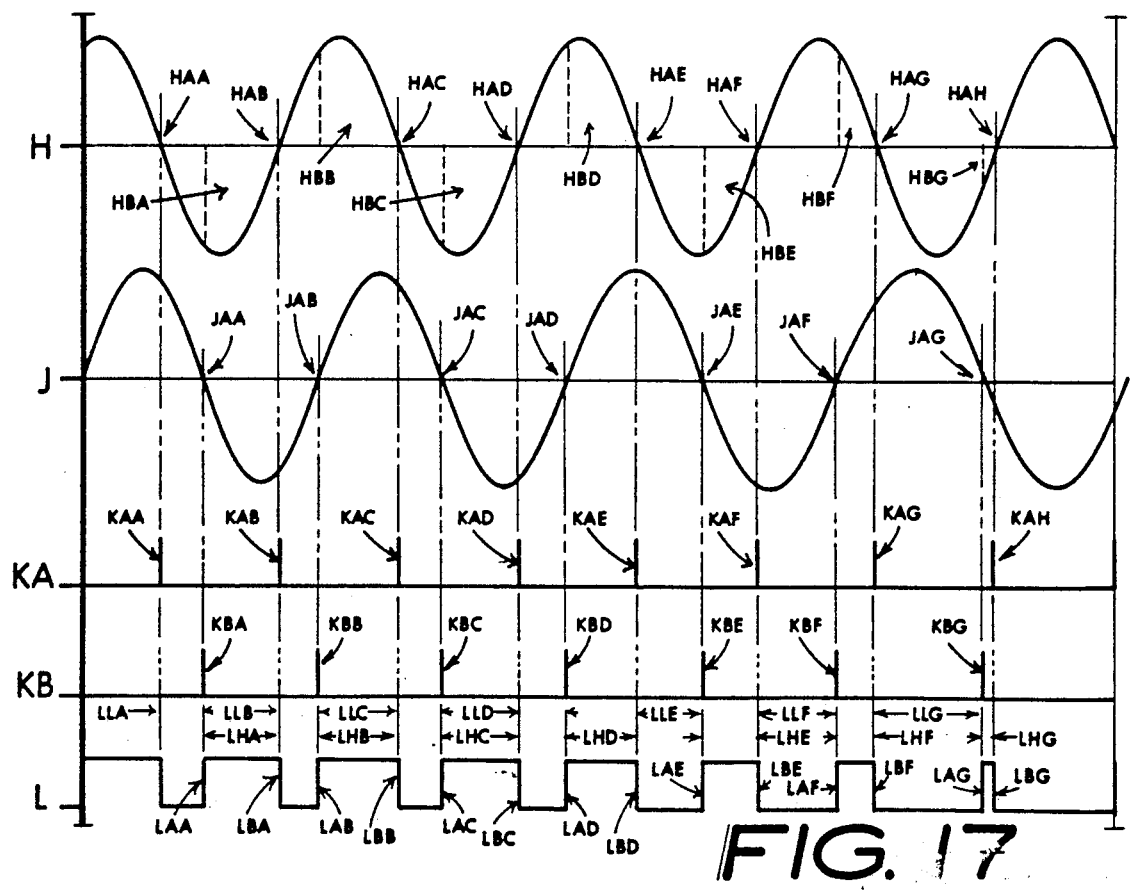
FIG. 17—Waveforms which depict operation of circuit of FIG. 16.

Although I have mentioned thyristor and triac power switching in my preceding examples for my invention, by no means is such mere embodiment a restriction. For example in FIG. 16 I show the use of a power field effect transistor (e.g., a MOSFET) 670 as the central element for power control. A motor including a START winding 102-2" (and start switch 104-1") has a RUN winding 102-1" hooked in series with a reactor winding 632-1 (shunted by a snubbing capacitor 634) and a current sensor resistor 642. The current phase voltage drop developed across the resistor 642 (depicted as waveform J in FIG. 17) produces a signal between lines 644-1 and 644-2 that couples with the current zero cross detector 640 to yield a pulse signal KB with each component pulse KBA-KBG coinciding with the corresponding zero-crossover levels JAA--JAG of the current waveform J. In a like way, the line voltage signal between lines 652-1 and 652-2 as applied to the voltage zero cross detector 650 deliver a pulse signal on line 654 having each component pulse KAA--KAH of waveform KA corresponding with a zero-crossover level HAA-HAH of the line voltage phase waveform H. The pulse on line 646 "sets" latch 660 now depicted as the pulse-edges LAA-LAG of waveform L in FIG. 17, while the pulse on line 654 "resets" the latch, bringing about the subsequent respective waveform L pulse transistions LBA-LBG on line 662. The operational result is that the power MOSFET 670 (which may be a Motorola MTP3055E) is turned-ON during the pulse L periods LHA-LHG, and held-OFF during the pulse L periods LLA-LLG. When the MOSFET 670 is "ON" it serves to shunt the cathode junctures of power diodes 672-1, 672-2 to the midtap of the reactor secondary winding 632-2. Since the ON state MOSFET "looks" like about 0.15 ohms shorted across the reactor's secondary the voltage drop developed across the primary winding 632-1 is "shorted out" resulting in about full a.c. power being coupled with the motor's RUN winding 102-1". You will find that changes in phase relationships between the voltage waveform H and the current waveform J of FIG. 17 serve to skew the ON and OFF cycle proportions of the MOSFET in proportion to motor loading, as determined by power factor changes. The practitioner of this art will also realize that, through the use of bipolar or MOSFET transistors for power control the reactor may be "shorted out" during portions of the a.c. power cycle not necessarily coinciding with zero-crossover for commutation, as ordinarily occurs when using thyristor power control.

Figure 18:
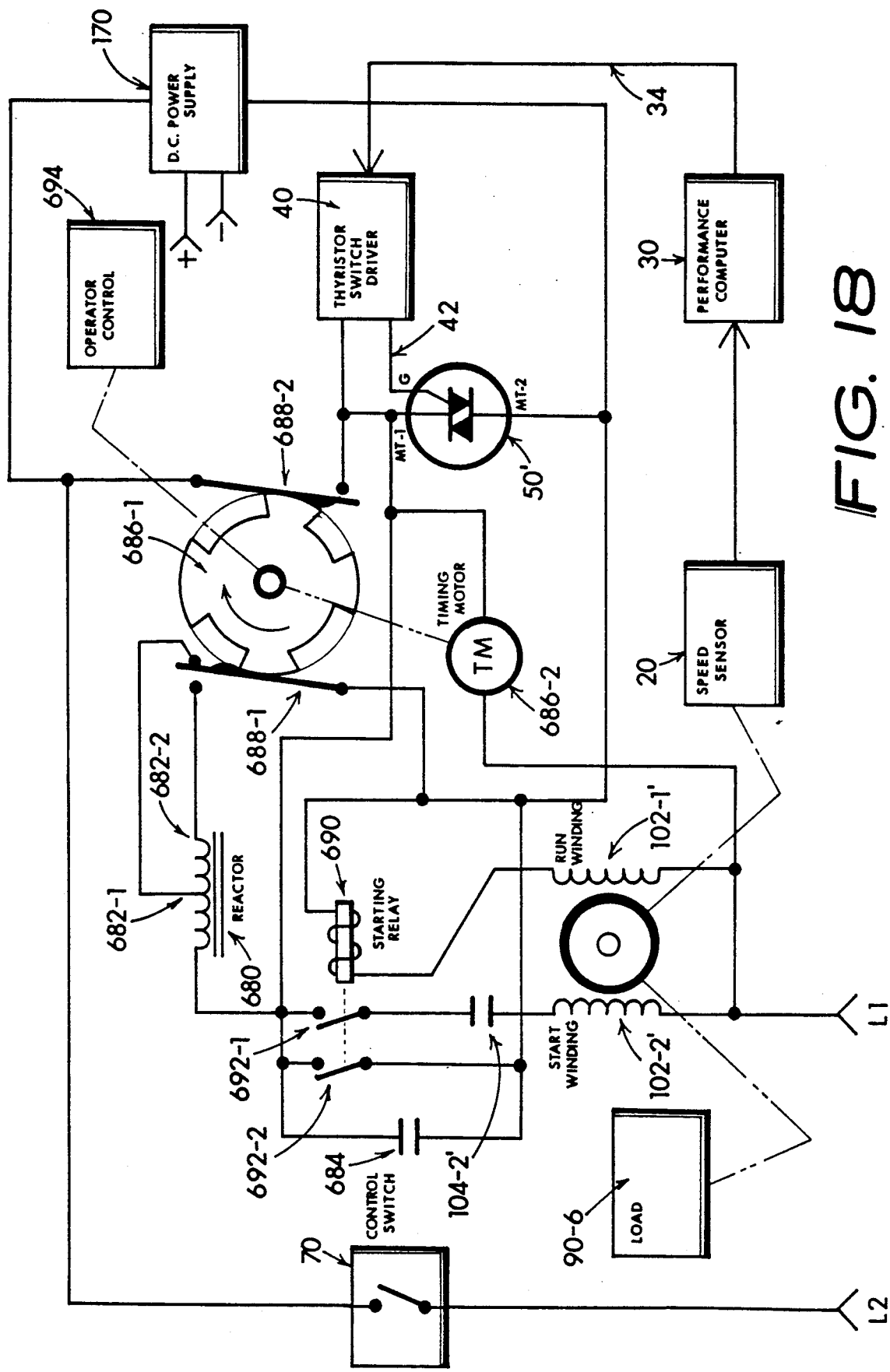
FIG. 18—Controller having pre-programmed control by a timer which sets motor operating level relative with predetermined load levels.

Predetermined levels of load may determined by a designer, and included as functional "steps" in the operation of my controller through the use of a hookup fashioned around the illustrative arrangement of FIG. 18. In a washing machine, for example, a cam-operated program timer is frequently used (such as made by Controls Company of America and Mallory Timers) which serves to operate the machine under a variety of load conditions between that of "light" to "heavy", depending upon the instant machine mode. For example, during "pump-out" of water, considerably less power is needed than during "spin-dry". In FIG. 18 I show the motor's RUN winding 102-1' to be fed line power through the seriate arrangement of a tapped reactor 680 starting relay 690 and a set of cam-actuated contacts 688-1. A program timer consisting mainly of a cam 686-1, motor 686-2, and contact sets 688-1, 688-2 serves to define the machines usual operating modes as is well known in the art. During initial induction motor "start-up", the start relay contacts 692-1 close connecting the START winding 102-2' with a.c. line L2. Also, contact set 692-2 closes coupling the RUN winding 102-1' and seriate relay coil 690 directly with the a.c. line L2. As such, all motor starting current is shunted around the thyristor 50. When the induction motor is running, the start relay contact sets OPEN and the current for the RUN winding 102-1' flows through a selected portion of the reactor 680 winding. When more load 90-6 power is needed, the switch contact set 688-1 is set to couple a.c. power into tap 682-1 of the reactor 680; while when less load power is needed, the switch contact set 688-1 alternately is set to couple a.c. power into tap 682-2 of the reactor. As a result of this action, more or less voltage drop occurs across the reactor 680 impedance (as shunted by snubber capacitor 684) depending upon whether the driven load 90-6 is light or heavy. The triac 50 shunts the active portion of the reactor, and operates in conjunction with the performance computer 30 to variably control the a.c. power delivered to the motor within the incremental power limit steps determined by the selected portions of the reactor which are coupled into the circuit. An operator control 694 is shown as the usual "control knob" or other arrangement which permits initial set-up of the functions for a washing machine, dishwasher, clothes dryer, or other such appliance. The practitioner of my invention will quickly realize that sometimes a microcontroller (microprocessor) may be used in lieu of the cam driven timer as the program controller for an appliance. It is obvious that, when using a microcontroller the depicted switch contact set 688-1 which makes selection of the reactor power level may just as well be a solidstate semiconductor switch, or a set of relay contacts operated by the microcontroller.

My invention shall not be construed to be merely limited to the embodiments shown. The essence of my invention is to provide modulated control of the a.c. power fed to an a.c. induction motor in relation to motor loading, with the change in motor power being mainly determined by permitting more or less change in voltage drop between the motor and a source of a.c. power as introduced by the reactance of an inductor that is periodically shunted by a semiconductor switch that turns ON and OFF in response to motor loading changes.

Clearly the choice of other circuit details, hardware kind, or operating level as well as the engineered characteristics of the induction motor and the reactor is merely within the scope of the usual variation which might be implemented by any person skilled in the art and shall not be construed as producing departure from my invention's essential teachings. It is anticipated that any clever artisan can develop a number of different approaches to obtain results comparable to mine, but that such differences in operative detail or application do not substantially detract from the underlying novelty of my invention.

You will also find that my invention has been revealed in the drawings and the attendant description through the use of a particular set of hardware devices and connections therebetween which lends itself to clear, readily understood signal paths and examples of operation. The use of microprocessor controlled circuitry and other types of sensors and power switching devices hooked-up to satisfy the essence of my inventions claims is anticipated to be within the scope of my invention and merely an obvious alternative implementation which may be undertaken by a suitably skilled artisan.

What I claim is:

1. Energy conserving method comprising the steps of:

providing a source of alternating current power;

operating an a.c. subsynchronous electric motor from the source of a.c. power;

driving a substantially inconstant mechanical load with the motor;

coupling a reactor substantially between the source of a.c. power and at least a main run winding of the electric motor;

determining the reactor to have a first impedance producing a first voltage drop when the motor is driving a minimum level of mechanical load;

determining changes in motor loading; and, shunting the reactor with an ON-state semiconductor switch during at least a portion of the period of a.c. power flow when the determined motor loading exceeds a predetermined value thereby reducing the level of the first voltage drop.

2. Method of claim 1 further comprising the steps of:

enabling phase-angle controlled turn-ON of the semiconductor switch in response to said determined changes in motor loading which exceed the minimum level of mechanical load; and, turning the semiconductor switch ON over a proportionately greater portion of each a.c. power half-cycle in response to determined increases in motor loading.

3. Method of claim 1 further comprising the steps of:
providing the reactor as an inductor comprising an reactive winding;
seriately coupling a portion of the reactive winding between the source of a.c. power and at least the main run winding of the electric motor; and,
shunting a portion of the reactive winding with the semiconductor switch.

4. Method of claim 1 further comprising the steps of:
sensing the subsynchronous motor speed slip; and,
determining an increase in motor speed slip as an increase in motor loading.

5. Method of claim 4 further comprising the steps of:
predetermining a value of subsynchronous motor speed while the motor is driving at the minimum level of mechanical load;
sensing a decrease in the motor speed caused by an increase in the level of mechanical load;
measuring the difference between the predetermined value of subsynchronous motor speed and the decreased motor speed; and,
determining an effective level of motor loading from the measured difference in motor speed.

6. Method of claim 1 further comprising the steps of:
sensing power-factor of the a.c. power flow between the source and the motor; and,
determining an increase in power factor as an increase in motor loading.

7. Method of claim 1 further comprising the steps of:
predetermining a program of seriate changes in the mechanical load; and,
determining motor loading from values provided by the program.

8. Energy conserving means comprising:
source of alternating current power;
induction motor means coupled with the a.c. power source;
reactor means for producing a reactive a.c. voltage drop coupled between the source and the motor means;
means for producing substantially inconstant mechanical loading of the motor means;
means for determining the motor loading produced by the mechanical load producing means;
semiconductor switch means coupled with the reactor means and the motor load determining means;
means for turning the switch means ON and reducing the voltage drop produced across the reactor means during at least a portion of the period of a.c. power flow when the motor loading is determined to exceed a minimum value.

9. Energy conserving means of claim 8 wherein:
said semiconductor switch means comprising thyristor means;
said energy conserving means further comprising:
means for enabling phase delayed turn-ON of the thyristor means during a portion of each a.c. power half-cycle; and,
means for determining less phase delay prior to enabling the turn-ON of the thyristor means in response to an increase in the determined motor loading.

10. Energy conserving means of claim 8 further comprising:
means for sensing motor speed slip; and,
means for determining a change in the sensed motor speed slip as a change in the motor loading.

11. Energy conserving means of claim 8 further comprising:
means for determining a first value signal representative of a subsynchronous motor speed under minimum load;
means for sensing a second value signal representative of the running motor speed under actual load;
means for determining effective difference between the first value signal and the second value signal; and,
means for determining the effective motor loading from the effective difference between the first and second value signals.

12. Energy conserving means of claim 8 further comprising:
means for sensing power factor of the a.c. power coupled between the source and the motor means; and,
means for determining an increase in power factor as an effective increase in the motor loading.

13. Energy conserving means of claim 8 further comprising:
means for establishing a seriate program of motor load operation; and,
means for determining effective motor loading from values obtained from the seriate program.

14. Energy conserving means of claim 8 wherein:
said reactor means comprising transformer means having at least two winding portions with one portion coupled effectively between the source and the motor means to produce a level of a.c. voltage drop therebetween; and,
said semiconductor switch means coupled with at least one of the winding portions and effective to reduce the level of a.c. voltage drop produced across the winding portion which is coupled between the source and the motor means whenever the switch means is turned-ON.

15. Energy conserving means of claim 8 wherein:
said reactor means comprising inductor means having winding means;
said energy conserving means further comprising:
means for coupling at least a portion of the winding means between the source and the motor means; and,
means for coupling the semiconductor switch means across said at least a portion of the winding means.

16. Energy conserving means of claim 8 further comprising:
means for sensing the motor speed;
means for comparing the sensed motor speed with a reference motor speed; and,
means for determining motor loading relative with any measure of difference between the compared motor speeds.

17. Energy conserving means comprising:
source of alternating current power;
induction motor means coupled with the a.c. power source;
means for producing a reactive voltage drop between the source and the motor means;
means for producing substantially inconstant mechanical loading of the motor means;
means for determining the motor loading produced by the mechanical load producing means; and, means for reducing the reactive voltage drop in response to a determined increase in motor loading above a predetermined level.

18. Energy conserving means of claim 17 further comprising:
means for sensing motor speed;
means for determining motor speed slip from the sensed motor speed; and,
means for determining a change in the motor speed slip as a change in level of the mechanical motor loading.

19. Energy conserving means of claim 18 wherein:
said inconstant mechanical load producing means comprising a refrigerant compressor means;
said motor speed sensing means comprising:
means for sensing the frequency of compression impulses produced by the compressor means; and,
means for deriving effective motor speed from the sensed compression impulse frequency.

20. Energy conserving means of claim 17 wherein:
said reactive voltage drop producing means includes inductor means having winding means;
said energy conserving means further comprising:
means for coupling at least a portion of the winding means between the source and the motor means;
wherein said means for reducing the reactive voltage drop includes semiconductor switch means coupled across said at least a portion of the winding means; and,
means for turning the semiconductor switch means ON during at least a portion of the period of a.c. power flow when the level of motor loading is determined to have increased above the predetermined level.

* * * * *